United States Patent
Ma et al.

(10) Patent No.: US 9,529,675 B2
(45) Date of Patent: Dec. 27, 2016

(54) DATA RECOVERY METHOD, DATA RECOVERY DEVICE AND DISTRIBUTED STORAGE SYSTEM

(71) Applicant: Huawei Technologies Co., Ltd., Shenzhen, Guangdong (CN)

(72) Inventors: Xiaohui Ma, Hangzhou (CN); Yaping Sun, Hangzhou (CN); Haixiao Chen, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 302 days.

(21) Appl. No.: 14/331,485

(22) Filed: Jul. 15, 2014

(65) Prior Publication Data
US 2015/0033070 A1      Jan. 29, 2015

Related U.S. Application Data

(63) Continuation of application No. PCT/CN2014/073383, filed on Mar. 13, 2014.

(30) Foreign Application Priority Data

Jul. 26, 2013   (CN) .......................... 2013 1 0320300

(51) Int. Cl.
*G06F 11/00*   (2006.01)
*G06F 11/10*   (2006.01)

(52) U.S. Cl.
CPC ....... *G06F 11/1088* (2013.01); *G06F 11/1076* (2013.01); *G06F 11/1084* (2013.01); *G06F 2211/1028* (2013.01)

(58) Field of Classification Search
CPC .............. G06F 11/1088; G06F 11/1076; G06F 11/1084; G06F 11/1096; G06F 2211/1028; G06F 2211/103
See application file for complete search history.

(56) References Cited

U.S. PATENT DOCUMENTS

| 5,412,671 A | 5/1995 | Tsuchiya |
| 8,516,342 B2 * | 8/2013 | Corbett ............... G06F 11/1076 714/770 |

(Continued)

FOREIGN PATENT DOCUMENTS

| CN | 1801105 A | 7/2006 |
| CN | 101512492 A | 8/2009 |
| CN | 103412799 A | 11/2013 |

OTHER PUBLICATIONS

Huang, Cheng, and Lihao Xu. "STAR: An efficient coding scheme for correcting triple storage node failures." IEEE Transactions on Computers 57, No. 7 (2008): pp. 889-901.*

(Continued)

*Primary Examiner* — Michael Maskulinski
*Assistant Examiner* — Anthony J Amoroso

(57) ABSTRACT

A data recovery method, a data recovery device and a distributed storage system are provided, where the method includes: in a case that a distributed storage system loses data of three nodes, recovering data on a target data storage node of the data on the three nodes according to data of a parity node and a data storage node without data loss; and performing degraded recovery on the remaining lost data according to the recovered data of the target data storage node. According to the embodiments of the present invention, a target data storage node first recovered is determined according to the symmetry of lost data, and the lost data of three nodes is recovered according to parity data and data that is not lost, which can improve the data recovery (Continued)

performance of the distributed storage system in a case that the data of three nodes is lost.

20 Claims, 8 Drawing Sheets

(56) References Cited

U.S. PATENT DOCUMENTS

| | | | |
|---|---|---|---|
| 8,645,751 B2* | 2/2014 | Cao | H03M 13/2918 714/6.2 |
| 2006/0129873 A1 | 6/2006 | Hafner | |
| 2007/0089045 A1 | 4/2007 | Corbett et al. | |
| 2008/0016435 A1 | 1/2008 | Goel | |

OTHER PUBLICATIONS

Pradeep Subedi, et al., "A Comprehensive Analysis of XOR-based Erasure Codes Tolerating 3 or More Concurrent Failures", 2013 IEEE 27th International Symposium on Parallel & Distributed Processing Workshops and PhD Forum, May 20, 2013, p. 1528-1537.

Yulin Wang, et al., "Triple-Star: A Coding Scheme with Optimal Encoding Complexity for Tolerating Triple Disk Failures in Raid", International Journal of Innovative Computing, Information and Control, vol. 8, No. 3(A), Mar. 2012, p. 1731-1742.

Mario Blaum, "A Coding Technique for Recovery Against Double Disk Failures in Disk Arrays", IEEE, 1992, p. 1366-1368.

Wu-Nan Wan, et al., "A Data Placement Based on Toleration on Triple Failures Array Codes in RAID", Chinese Journal of Computers, vol. 30, No. 10, Oct. 2007, p. 1721-1730.

Mario Blaum, et al., "EVENODD: An Efficient Scheme for Tolerating Double Disk Failures in RAID Architectures", IEEE Transactions on Computers, vol. 44, No. 2, Feb. 1995, p. 192-202.

\* cited by examiner

DATA RECOVERY METHOD, DATA RECOVERY DEVICE AND DISTRIBUTED STORAGE SYSTEM

CROSS-REFERENCE TO RELATED APPLICATIONS

This application is a continuation of International Application No. PCT/CN2014/073383, filed on Mar. 13, 2014, which claims priority to Chinese Patent Application No. 201310320300.3, filed on Jul. 26, 2013, both of which are hereby incorporated by reference in their entireties.

TECHNICAL FIELD

The present invention relates to the field of computer technologies, and in particular, to a data recovery method, a data recovery device and a distributed storage system.

BACKGROUND

With the popularization of cloud computing technologies, cloud storage is becoming increasingly closer to the life of people. Cloud storage suppliers also increase year by year. At present, a quantity of suppliers in the industry is nearly 200. Data can be stored on a remote cloud storage system; therefore, demands on local storage can be greatly reduced. However, cloud storage still faces various problems, for example, how to use the lowest cost to provide the highest reliability for user data, and how to guarantee security of the user data and prevent the user data from being stolen, encrypted, or the like.

To guarantee the security of the user data, same data can be replicated into multiple replications and stored on different storage nodes. If an error occurs on a certain storage node, a user can acquire the data as long as one storage node exists. For example, if three replications are produced, a space waste rate reaches 3 times of that of the original data. For the cloud storage suppliers, adopting a replication seriously wastes a storage space, and causes a very high cost.

To improve storage space utilization, an erasure code which is a generally used data redundancy correction algorithm can be adopted to replace the replication. Reed Solomon Code is the most famous Erasure Code, which multiplies a GF matrix by the data to obtain a check code. However, for a computer Central Processing Unit (CPU), performance of multiplication is very low; therefore, the Reed Solomon Code algorithm has relatively low performance. In addition, at present, a maximum bit width of data in the Reed Solomon Code algorithm is 32 bits, which greatly limits the performance because a larger bit width means higher performance.

Besides, EVENODD proposed by IBM in early stage is an algorithm having a redundancy rate of 2 (possessing two groups of parity data) and aiming at a redundant array of independent disks (RAID), redundant array of independent disks) system. Cheng Huang and Lihao Xu proposed a STAR algorithm (a parity with a slope of −1 is added) that extends the redundancy rate of EVENODD to 3 (possessing three groups of parity data).

When three data storage nodes (that is, three data disks) are lost, adopting EVENODD and STAR recovery algorithms is complex, and the algorithms are difficult to implement by using coding. When two data storage nodes and a horizontal parity node (that is, two data disks, horizontal correcting disk) are lost, data on the horizontal parity node needs to be recovered first, and then original data on the data storage nodes is recovered; therefore, recovery performance is low, and the algorithm is not easy to implement by using coding.

SUMMARY

In view of this, a technical problem that needs to be solved by the present invention is that an existing distributed storage system has relatively low data recovery performance.

To solve the foregoing technical problem, a data recovery method is provided according to an embodiment of the present invention, including:

in a case that a distributed storage system loses data on three nodes, recovering data on a target data storage node of the data on the three nodes according to data on a parity node and a data storage node without data loss, where the target data storage node is determined according to symmetry of the lost data; and performing degraded recovery on remaining lost data according to the recovered data on the target data storage node.

For the foregoing data recovery method, in one possible implementation manner, in a case that the lost data on the three nodes includes data on three data storage nodes, the target data storage node is a data storage node with data loss and having an intermediate disk number; and the recovering data on a target data storage node of the data on the three nodes according to data on a parity node and a data storage node without data loss includes:

generating a diagonal adjuster and an inverse diagonal adjuster according to parity data, where the parity data includes data on a horizontal parity node, a diagonal parity node and an inverse diagonal parity node;

generating first horizontal parity data, first diagonal parity data and first inverse diagonal parity data according to the data on the data storage node without data loss, the diagonal adjuster and the inverse diagonal adjuster; and obtaining, by using an optimized cross transposition operation, the data on the data storage node with data loss and having the intermediate disk number according to the diagonal adjuster, the inverse diagonal adjuster, the first horizontal parity data, the first diagonal parity data and the first inverse diagonal parity data.

For the foregoing data recovery method, in one possible implementation manner, the generating a diagonal adjuster and an inverse diagonal adjuster according to parity data includes:

generating the diagonal adjuster by using a formula $$Q_s = \bigoplus_{i=0}^{p-2}(P_i \oplus Q_i);$$

and generating the inverse diagonal adjuster by using a formula $$R_s = \bigoplus_{i=0}^{p-2}(P_i \oplus R_i),$$

where:

$Q_s$ is the diagonal adjuster, $R_s$ is the inverse diagonal adjuster, $P_i$ is data of the $i^{th}$ stripe unit on the horizontal parity node, $Q_i$ is data of the $i^{th}$ stripe unit on the diagonal parity node, $R_i$ is data of the $i^{th}$ stripe unit on the inverse diagonal parity node, $0 \leq i \leq p-2$, and p is a prime number greater than or equal to a quantity of the data storage nodes.

For the foregoing data recovery method, in one possible implementation manner, the generating first horizontal parity data, first diagonal parity data and first inverse diagonal parity data according to the data on the data storage node without data loss, the diagonal adjuster and the inverse diagonal adjuster includes:

generating the first horizontal parity data by using a formula $$P_i' = P_i \oplus \left( \bigoplus_{\substack{j=0 \\ j \neq r,s,t}}^{p'-1} D_{i,j} \right);$$

generating the first diagonal parity data by using a formula $$Q_i' = Q_s \oplus Q_i \oplus \left( \bigoplus_{\substack{j=0 \\ j \neq r,s,t}}^{p'-1} D_{\langle i-j \rangle_p, j} \right);$$

and generating the first inverse diagonal parity data by using a formula $$R_i' = R_s \oplus R_i \oplus \left( \bigoplus_{\substack{j=0 \\ j \neq r,s,t}}^{p'-1} D_{\langle i+j \rangle_p, j} \right),$$

where:

$P_i'$ is the first horizontal parity data, $Q_i'$ is the first diagonal parity data, $R_i'$ is the first inverse diagonal parity data, $D_{i,j}$ is data of the $i^{th}$ stripe unit on a data storage node in the $j^{th}$ row, r, s, and t are disk numbers of the data storage nodes with data loss, p' is the quantity of the data storage nodes, $0 \leq j \leq p'-1$, $0 \leq r < s < t \leq p' \leq p$, and $\langle \rangle_p$ is to perform a modulus operation on p.

For the foregoing data recovery method, in one possible implementation manner, the obtaining, by using an optimized cross transposition operation, the data on the data storage node with data loss and having the intermediate disk number according to the diagonal adjuster, the inverse diagonal adjuster, the first horizontal parity data, the first diagonal parity data and the first inverse diagonal parity data includes:

creating, by using the cross transposition operation, a formula of the data storage node with data loss and having the intermediate disk number:

$A_d = D_{d,s} \oplus D_{<d+a>_p,s} \oplus D_{<d+b>_p,s} \oplus D_{<d+a+b>_p,s} = P_{<d>_p}' \oplus P_{<d+a+b>_p}' \oplus R_{<d-r>_p}' \oplus Q_{<d+t>_p}'$, where:

$0 \leq d \leq p-1$, s is a disk number of the data storage node with data loss and having the intermediate disk number, and a and b are disk number differences between the three data storage nodes with data loss, where a=s−r, b=t−s; and after performing elimination on the formula of the data storage node with data loss and having the intermediate disk number according to a shift step size and a quantity of cyclic XOR sum times determined according to the disk number differences between the data storage nodes with data loss, transforming the data of the stripe units on all the data storage nodes with data loss into an XOR sum of data of two stripe units on the data storage node with data loss and having the intermediate disk number, and obtaining data on the data storage node with data loss and having the intermediate disk number.

For the foregoing data recovery method, in one possible implementation manner, after performing elimination on the formula of the data storage node with data loss and having the intermediate disk number, the transforming the data of the stripe units on all the data storage nodes with data loss into an XOR sum of data of two stripe units on the data storage node with data loss and having the intermediate disk number includes:

adopting a step size offDis to perform XOR sum for k times on the formula of the data storage node with data loss and having the intermediate disk number, to obtain a formula $$D_{u,s} \oplus D_{\langle u+2minDis \rangle_p, s} = \sum_{v=0}^{k-1} A_{\langle u+v \times offDis \rangle_p}$$

of the data storage node with data loss and having the intermediate disk number, where k is determined according to a formula $$\begin{cases} \langle b - m \times a \rangle_p = 0 \\ \langle a - n \times b \rangle_p = 0 \; ; \\ k = \min\{m, n\} \end{cases}$$

if k=m, then min Dis=b, offDis=a; otherwise, min Dis=a, offDis=b, $\langle u+v \times offDis \rangle_p$=d, and $0 \leq u \leq p-1$, where:

a cyclic equation set obtained according to the formula of the intermediate data storage node is used to represent the XOR sum of two piece of data on the intermediate data storage node, and each formula in the cyclic equation set at most has two variables; and the obtaining data on the data storage node with data loss and having the intermediate disk number includes:

substituting virtually-zero-filled data $D_{p-1,s}=0$ of a stripe unit on the data storage node with data loss and having the intermediate disk number into a formula having only one variable in the cyclic equation set for a solution, solving other formulas in the cyclic equation set in sequence according to a result of the solution, and obtaining each piece of data on the data storage node with data loss and having the intermediate disk number.

For the foregoing data recovery method, in one possible implementation manner, in a case that the lost data on the three nodes includes data on a horizontal parity node and two data storage nodes, the target data storage node is either of the two data storage nodes with data loss; and the recovering data on a target data storage node of the data on the three nodes according to data on a parity node and a data storage node without data loss includes:

generating an XOR sum of the diagonal adjuster and the inverse diagonal adjuster according to data on the diagonal parity node and the inverse diagonal parity node;

generating second diagonal parity data and second inverse diagonal parity data according to the data on the data storage node without data loss; and performing a symmetric elimination operation according to the XOR sum of the diagonal adjuster and the inverse diagonal adjuster, the second diagonal parity data and the second inverse diagonal parity data, to obtain data on either of the two data storage nodes with data loss.

For the foregoing data recovery method, in one possible implementation manner, the generating an XOR sum of the diagonal adjuster and the inverse diagonal adjuster according to data on the diagonal parity node and the inverse diagonal parity node includes:

generating the XOR sum of the diagonal adjuster and the inverse diagonal adjuster by using a formula $$Q_S \oplus R_S = \left(\bigoplus_{i=0}^{p-2} Q_i\right) \oplus \left(\bigoplus_{i=0}^{p-2} R_i\right),$$

where $Q_s$ is the diagonal adjuster, $R_s$ is the inverse diagonal adjuster, $Q_i$ is data of the $i^{th}$ stripe unit on the diagonal parity node, $R_i$ is data of the $i^{th}$ stripe unit on the inverse diagonal parity node, $0 \leq i \leq p-2$, p is a disk number of the lost horizontal parity data, and p is a prime number greater than or equal to the quantity of the data storage nodes.

For the foregoing data recovery method, in one possible implementation manner, the generating second diagonal parity data and second inverse diagonal parity data according to the data on the data storage node without data loss includes:

generating the second diagonal parity data by using a formula $$Q'_i = Q_i \oplus \left(\bigoplus_{\substack{j=0 \\ j \neq r,s}}^{p'-1} D_{\langle i-j \rangle_p, j}\right);$$

and generating the second inverse diagonal parity data by using a formula $$R'_i = R_i \oplus \left(\bigoplus_{\substack{j=0 \\ j \neq r,s}}^{p'-1} D_{\langle i+j \rangle_p, j}\right),$$

where:

$Q_i'$ is the second diagonal parity data, $R_i'$ is the second inverse diagonal parity data, $D_{i,j}$ is data of the $i^{th}$ stripe unit on a data storage node in the $j^{th}$ row, r and s are disk numbers of the data storage nodes with data loss, p' is the quantity of the data storage nodes, $0 \leq j \leq p'-1$, $0 \leq r < s < p' \leq p$, and $\langle \rangle_p$ is to perform a modulus operation on p.

For the foregoing data recovery method, in one possible implementation manner, the performing a symmetric elimination operation according to the XOR sum of the diagonal adjuster and the inverse diagonal adjuster, the second diagonal parity data and the second inverse diagonal parity data, to obtain data on either of the two lost data storage nodes includes:

transforming the data of the stripe units on the two data storage nodes with data loss into an XOR sum of data of two stripe units on one data storage node by performing elimination on a created lost data formula $D_{u,s} \oplus D_{\langle u+2(s-r)\rangle_p,s} \oplus Q_s \oplus R_s = Q_{\langle u+s\rangle_p}' \oplus R_{\langle u+s-2r\rangle_p}'$, to obtain a formula $D_{u,s} \oplus Q_{\langle u+2(s-r)\rangle_p,s} = Q_{\langle u+s\rangle_p}' \oplus R_{\langle u+s-2r\rangle_p}' \oplus Q_s \oplus R_s$, and obtaining lost data on a data storage node in the $s^{th}$ row according to virtually-zero-filled data $D_{p-1,s}=0$ of the stripe unit; or transforming the data of the stripe units on the two data storage nodes with data loss into an XOR sum of data of two stripe units on one data storage node by performing elimination on a created lost data formula $D_{u,r} \oplus D_{\langle u+2(s-r)\rangle_p,r} \oplus Q_s \oplus R_s = Q_{\langle u+2s-r\rangle_p}' \oplus R_{\langle u+r-r\rangle_p}'$, to obtain a formula $D_{u,r} \oplus Q_{\langle u+2(s-r)\rangle_p,r} = Q_{\langle u+2s-r\rangle_p}' \oplus R_{\langle u-r\rangle_p}' \oplus Q_s \oplus R_s$, and obtaining lost data on a data storage node in the $r^{th}$ row according to virtually-zero-filled data $D_{p-1,r}=0$ of the stripe unit.

To solve the foregoing technical problem, a data recovery device is provided according to another embodiment of the present invention, including:

a target recovery unit, configured to, in a case that data on three nodes are lost in a distributed storage system, recover data on a target data storage node of the data on the three nodes according to data on a parity node and a data storage node without data loss, where the target data storage node is determined according to symmetry of the lost data; and a degraded recovery unit, configured to perform degraded recovery on the remaining lost data according to the recovered data on the target data storage node.

For the foregoing data recovery device, in one possible implementation manner, in a case that the lost data on the three nodes includes data on three data storage nodes, the target data storage node is a data storage node with data loss and having an intermediate disk number; and the target recovery unit includes:

an adjuster generating module, configured to generate a diagonal adjuster and an inverse diagonal adjuster according to parity data, where the parity data includes data on a horizontal parity node, a diagonal parity node and an inverse diagonal parity node;

a first parity data generating module, configured to generate first horizontal parity data, first diagonal parity data and first inverse diagonal parity data according to the data on the data storage node without data loss, the diagonal adjuster and the inverse diagonal adjuster; and across transposition operation module, configured to obtain data on a data storage node having an intermediate disk number by performing an optimized cross transposition operation according to the diagonal adjuster, the inverse diagonal adjuster, the first horizontal parity data, the first diagonal parity data and the first inverse diagonal parity data.

For the foregoing data recovery device, in one possible implementation manner, the adjuster generating module is specifically configured to:

generate the diagonal adjuster by using a formula $$Q_s = \bigoplus_{i=0}^{p-2}(P_i \oplus Q_i);$$

and generate the inverse diagonal adjuster by using a formula $$R_s = \bigoplus_{i=0}^{p-2}(P_i \oplus R_i),$$

where:

$Q_s$ is the diagonal adjuster, $R_s$ is the inverse diagonal adjuster, $P_i$ is data of the $i^{th}$ stripe unit on the horizontal parity node, $Q_i$ is data of the $i^{th}$ stripe unit on the diagonal parity node, $R_i$ is data of the $i^{th}$ stripe unit on the inverse diagonal parity node, $0 \leq i \leq p-2$, and p is a prime number greater than or equal to a quantity of the data storage nodes.

For the foregoing data recovery device, in one possible implementation manner, the first parity data generating module is specifically configured to:

generate the first horizontal parity data by using a formula $$P'_i = P_i \oplus \left( \bigoplus_{\substack{j=0 \\ j \neq r,s,t}}^{p'-1} D_{i,j} \right);$$

generate the first diagonal parity data by using a formula $$Q'_i = Q_s \oplus Q_i \oplus \left( \bigoplus_{\substack{j=0 \\ j \neq r,s,t}}^{p'-1} D_{\langle i-j \rangle_p, j} \right);$$

and generate the first inverse diagonal parity data by using a formula $$R'_i = R_s \oplus R_i \oplus \left( \bigoplus_{\substack{j=0 \\ j \neq r,s,t}}^{p'-1} D_{\langle i+j \rangle_p, j} \right),$$

where:

$P'_i$ is the first horizontal parity data, $Q'_i$ a is the first diagonal parity data, $R'_i$ is the first inverse diagonal parity data, $D_{i,j}$ is data of the $i^{th}$ stripe unit on a data storage node in the $j^{th}$ row, r, s, and t are disk numbers of the data storage nodes with data loss, p' is the quantity of the data storage nodes, $0 \leq j \leq p'-1$, $0 \leq r < s < t < p' \leq p$, and $\langle \rangle_p$ is to perform a modulus operation on p.

For the foregoing data recovery device, in one possible implementation manner, the cross transposition operation module is specifically configured to:

create a formula of the data storage node with data loss and having the intermediate disk number by performing a cross transposition operation:

$$A_d = D_{d,s} \oplus D_{\langle d+a \rangle_p, S} \oplus D_{\langle d+b \rangle_p, S}$$
$$\oplus D_{\langle d+a+b \rangle_p, S} = P_{\langle d \rangle_p} \oplus P_{\langle d+a+b \rangle_p} \oplus Q_{\langle d+t \rangle_p},$$

where:

$0 \leq d \leq p-1$, s is a disk number of the data storage node with data loss and having the intermediate disk number, and a and b are disk number differences between the three data storage nodes with data loss, where $a = s-r$, $b = t-s$, and after performing elimination on the formula of the data storage node with data loss and having the intermediate disk number according to a shift step size and a quantity of cyclic XOR sum times determined according to the disk number differences between the data storage nodes with data loss, transform data of the stripe units on all the data storage nodes with data loss into an XOR sum of data of two stripe units on the data storage node with data loss and having the intermediate disk number, and obtain data on the data storage node with data loss and having the intermediate disk number.

For the foregoing data recovery device, in one possible implementation manner, the cross transposition operation module is further specifically configured to:

adopt a step size offDis to perform XOR sum for k times on the formula of the data storage node with data loss and having the intermediate disk number, to obtain a formula $$D_{u,s} \oplus D_{\langle u+2minDis \rangle_p, s} = \sum_{v=0}^{k-1} A_{\langle u + v \times offDis \rangle_p}$$

of the data storage node with data loss and having the intermediate disk number, where k is determined according to a formula $$\begin{cases} \langle b - m \times a \rangle_p = 0 \\ \langle a - n \times b \rangle_p = 0 \\ k = \min\{m, n\} \end{cases};$$

if $k=m$, then min Dis=b, offDis=a; otherwise, min Dis=a, offDis=b, $\langle u+v \times offDis \rangle_p = d$, and $0 \leq u \leq p-1$, where:

a cyclic equation set obtained according to the formula of the data storage node with data loss and having the intermediate disk number is used to represent an XOR sum of two pieces of data on the intermediate data storage node, and each formula in the cyclic equation set at most has two variables;

the obtaining data on the data storage node with data loss and having the intermediate disk number, includes:

substituting virtually-zero-filled data $D_{p-1,s}=0$ of a stripe unit on the data storage node with data loss and having the intermediate disk number into a formula having only one variable in the cyclic equation set for a solution, solving other formulas in the cyclic equation set in sequence according to a result of the solution, and obtaining each piece of data on the data storage node with data loss and having the intermediate disk number.

For the foregoing data recovery device, in one possible implementation manner, in a case that the lost data on the three nodes includes data on a horizontal parity node and two data storage nodes, the target recovery unit includes:

an adjuster XOR sum module, configured to generate an XOR sum of a diagonal adjuster and an inverse diagonal adjuster according to data on the diagonal parity node and the inverse diagonal parity node;

a second parity data generating module, configured to generate second diagonal parity data and second inverse diagonal parity data according to the data on the data storage node without data loss; and a symmetric elimination operation module, configured to obtain data on either of the two data storage nodes with data loss by performing a symmetric elimination operation according to the XOR sum of the diagonal adjuster and the inverse diagonal adjuster, the second diagonal parity data and the second inverse diagonal parity data.

For the foregoing data recovery device, in one possible implementation manner, the adjuster XOR sum module is specifically configured to:

generate the XOR sum of the diagonal adjuster and the inverse diagonal adjuster by using a formula $$Q_S \oplus R_S = \left( \bigoplus_{i=0}^{p-2} Q_i \right) \oplus \left( \bigoplus_{i=0}^{p-2} R_i \right),$$

where $Q_s$ is the diagonal adjuster, $R_s$ is the inverse diagonal adjuster, $Q_i$ is data of the $i^{th}$ stripe unit on the diagonal parity node, $R_i$ is data of the $i^{th}$ stripe unit on the inverse diagonal parity node, $0 \leq i \leq p-2$, p is a disk number of the lost horizontal parity data, and p is a prime number greater than or equal to the quantity of the data storage nodes.

For the foregoing data recovery device, in one possible implementation manner, the second parity data generating module is specifically configured to:

generate the second diagonal parity data by using a formula $$Q'_i = Q_i \oplus \left( \bigoplus_{\substack{j=0 \\ j \neq r,s}}^{p'-1} D_{\langle i-j \rangle_p, j} \right);$$

and generate the second inverse diagonal parity data by using a formula $$R'_i = R_i \oplus \left( \bigoplus_{\substack{j=0 \\ j \neq r,s}}^{p'-1} D_{\langle i+j \rangle_p, j} \right),$$

where:

$Q'_i$ is the second diagonal parity data, $R'_i$ is the second inverse diagonal parity data, $D_{i,j}$ is data of the $i^{th}$ stripe unit on a data storage node in the $i^{th}$ row, r and s are disk numbers of the data storage nodes with data loss, $0 \leq j \leq p'-1$, $0 \leq r < s < p' \leq p$, and $\langle \rangle_p$ is to perform a modulus operation on p.

For the foregoing data recovery device, in one possible implementation manner, the symmetric elimination operation module is specifically configured to:

transform the data of the stripe units on the two data storage nodes with data loss into an XOR sum of data of two stripe units on one data storage node by performing elimination on a created lost data formula $D_{u,s} \oplus D_{\langle u+2(s-r) \rangle_p, s} \oplus Q_s \oplus R_s = Q_{\langle u+s \rangle_p}' \oplus R_{\langle u+s-2r \rangle_p}'$, to obtain a formula $D_{u,s} \oplus Q_{\langle u+2(s-r) \rangle_p, s} = Q_{\langle u+s \rangle_p}' \oplus R_{\langle u+s-2r \rangle_p}' \oplus Q_s \oplus R_s$, and obtain lost data on a data storage node in the $s^{th}$ row according to virtually-zero-filled data $D_{p-1,s}=0$ of the stripe unit; or transform the data of the stripe units on the two data storage nodes with data loss into an XOR sum of data of two stripe units on one data storage node by performing elimination on a created lost data formula $D_{u,r} \oplus D_{\langle u+2(s-r) \rangle_p, r} \oplus Q_s \oplus R_s = Q_{\langle u+2s-r \rangle_p}' \oplus R_{\langle u+r-r \rangle_p}'$, to obtain a formula $D_{u,r} \oplus D_{\langle u+2(s-r) \rangle_p, r} = Q_{\langle u+2s-r \rangle_p}' \oplus R_{\langle u-r \rangle_p}' \oplus Q_s \oplus R_s$, and obtain lost data on a data storage node in the $r^{th}$ row according to virtually-zero-filled data $D_{p-1,r}=0$ of the stripe unit.

To solve the foregoing technical problem, a distributed storage system is provided according to another embodiment of the present invention, including a plurality of data storage nodes, a plurality of parity nodes and a data recovery device, where:

a data recovery device of any structure of the embodiment of the present invention is adopted as the data recovery device.

According to the embodiments of the present invention, parity data is used to perform data recovery, which can ensure effective utilization in a distributed system such as a storage space of cloud storage, so as to meet a performance requirement of the distributed storage system; and in a case that data on three nodes is lost, a target data storage node first recovered is determined according to symmetry of the lost data, and the lost data on the three nodes is recovered according to parity data and data that is not lost, which can improve data recovery performance of the distributed storage system.

Other characteristics and aspects of the present invention will become clear according to the detailed description of the exemplary embodiments with reference to accompanying drawings.

BRIEF DESCRIPTION OF THE DRAWINGS

Accompanying drawings included in the specification and constructing a part of the specification jointly show the exemplary embodiments, characteristics and aspects of the present invention, and are intended to explain the principles of the present invention.

DETAILED DESCRIPTION

Figure 1A:
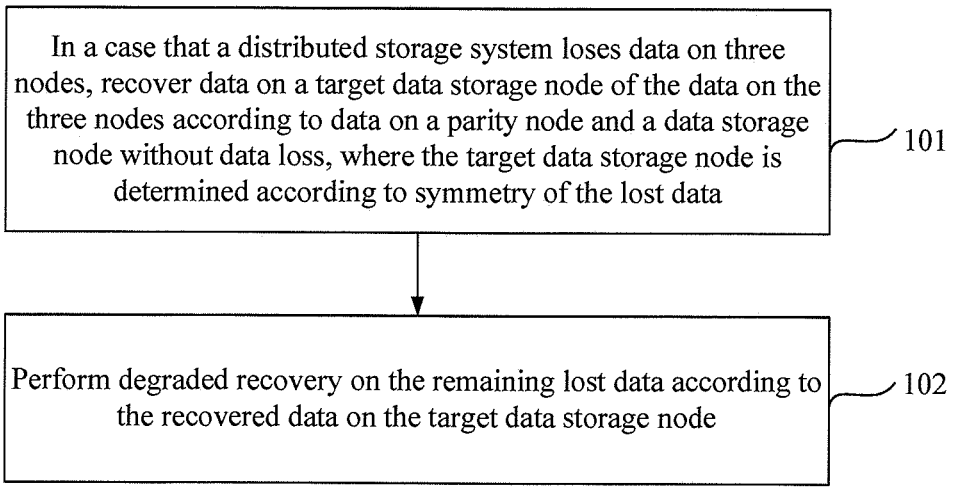
FIG. 1a is a flowchart of a data recovery method according to Embodiment 1 of the present invention.

Various exemplary embodiments, characteristics and aspects of the present invention will be described in details with reference to the accompanying drawings. The same drawing labels in the drawings represent components having the same or similar functions. Although various aspects of the embodiments are shown in the drawings, it is not necessary to draw the drawings in proportion unless otherwise specified.

The specific term "exemplary" herein means "used as an example, embodiment or illustrative". It is not necessary to explain any "exemplary" embodiment stated herein as being superior to or better than other embodiments.

In addition, to better explain the present invention, various specific details are given in the specific embodiments hereinafter. A person skilled in the art should understand that the present invention may still be implemented without these specific details. In some other embodiments, well-known methods, means, elements and circuits are not described in detail, so as to highlight the main purpose of the present invention.

Embodiment 1

FIG. 1a is a flowchart of a data recovery method of Embodiment 1 of the present invention. As shown in FIG. 1a, the data recovery method includes:

Step 101: In a case that a distributed storage system loses data on three nodes, recover data on a target data storage node of the data on the three nodes according to data on a parity node and a data storage node without data loss, where the target data storage node is determined according to symmetry of the lost data.

Step 102: Perform degraded recovery on remaining lost data according to the recovered data on the target data storage node.

Figure 1B:
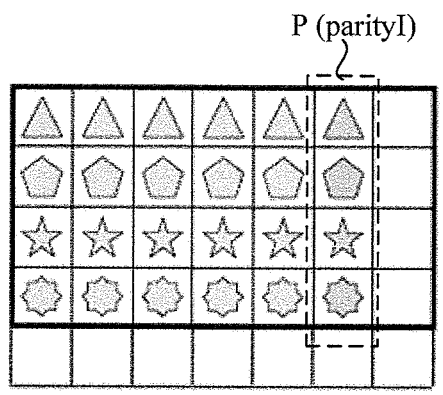
FIG. 1b to FIG. 1d are schematic diagrams of parity nodes in the data recovery method according to Embodiment 1 of the present invention.
Figure 1C:
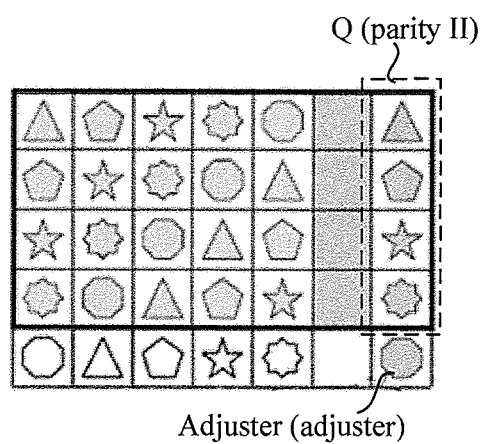
Figure 1D:
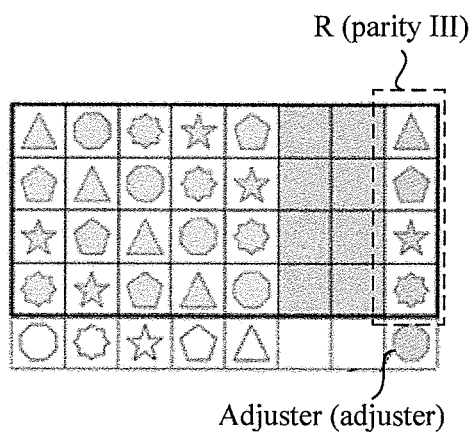

Preferably, if a quantity of the data storage nodes (data disks) in the distributed system or RAID is p', each data storage node may be divided into p stripe units, where p≥p', and p is a prime number. In addition, the distributed system or RAID may have 3 parity nodes; therefore, the total number of nodes is p'+3. 0~p'−1 is a disk number of the data storage nodes, each disk is divided into p−1 stripes of a same size, a value range of a stripe number i is 0~p−2, and data of a stripe in the $(p-1)^{th}$ row is virtually-zero-filled data, which does not exist on the storage node. From a perspective of math, the data storage node after partitioning may be considered as a matrix D, where $D_{i,j}$ may represent data of the $i^{th}$ stripe unit on the $j^{th}$ data storage node, $P_i$ represents data of the $i^{th}$ stripe unit on a horizontal parity node, $Q_i$ represents data of the $i^{th}$ stripe unit on a diagonal parity node, and $R_i$ represents data of the $i^{th}$ stripe unit on an inverse diagonal parity node. FIG. 1b to FIG. 1d are schematic diagrams of parity nodes in the data recovery method of Embodiment 1 of the present invention. Referring to FIG. 1b, a generation manner of a horizontal parity node P (parity I) may be obtained by performing XOR on patterns of a same type. Referring to FIG. 1c, a generation manner of a diagonal parity node Q (parity II) with a slope of "1" may be obtained by performing XOR on data represented by patterns of a same type on the data storage nodes after XOR and a value of an adjuster in the last row, where the adjuster is not stored. Referring to FIG. 1d, a generation manner of an inverse diagonal parity node R (parity III) with a slope of "−1" is similar to that of the diagonal parity node, where only positions of the patterns of the same type on the data storage node are in an inverse sequence. In addition, a parity node with another slope may also be used, for example, a parity node with a slope of "2" and a parity node with a diagonal of "−2"

In the embodiment of the present invention, the lost data on the three nodes in the distributed storage system may include the following cases:

Case 1: In a case that the lost data on the three nodes include data on three data storage nodes, the target data storage node is a data storage node with data loss and having an intermediate disk number.

For case 1, when the lost data on the three data storage nodes is recovered, the target data storage node first recovered may be the data storage node with data loss and having the intermediate disk number (intermediate node for short). For example, a disk number difference between a data storage node with data loss and having a maximum disk number (maximum node for short) and the intermediate node, a disk number difference between a data storage node with data loss and having a minimum disk number (minimum node for short) and the intermediate node may be calculated, to determine a minimum number of XOR times and a step size, and the data on the maximum node with data loss and data on the minimum node with data loss are transformed into XOR sums of data of two stripe units on the intermediate node with data loss, so as to obtain p pairs of XOR sums; and then data of all the stripe units on the intermediate node is gradually obtained according to virtually-zero-filled data of the stripe units on the intermediate node, and further, the lost data on the remaining two nodes may be recovered in a degraded manner.

Case 2: In a case that the lost data on the three nodes includes data on a horizontal parity node and two data storage nodes, the target data storage node is either of the two data storage nodes with data loss.

For case 2, when the lost data on the horizontal parity node and the two data storage nodes are recovered, the lost data on the data storage nodes may be first recovered and provided for a user, and then the lost data on the horizontal parity node is recovered. An XOR sum of an adjuster on the diagonal parity node and an adjuster on the inverse diagonal parity node may be obtained by using XOR performed on the data of all the stripe units on the two parity nodes. XOR performed on an adjuster on a diagonal parity node and an adjuster on an inverse diagonal parity node of a public stripe unit can transform the data of the stripe units on the two data storage nodes with data loss into the XOR sum of data of two stripe units on one data storage node. Then, according to virtually-zero-filled data of the stripe units on the data storage node, data of all the stripe units on the data storage node can be obtained gradually, and further, data on another data storage node and data on the horizontal parity node can be recovered.

According to the embodiment of the present invention, parity data is used to perform data recovery, which can ensure effective utilization of a storage space in a distributed system, so as to meet a performance requirement of the distributed storage system; and in a case that data on three nodes is lost, a target data storage node first recovered is determined according to symmetry of the lost data, and the lost data on the three nodes is recovered according to parity data and data that is not lost, which can improve data recovery performance of the distributed storage system. In addition, data is distributed on different data storage nodes, facilitating data confidentiality and making user data safer. In a case that data on three data storage nodes is lost, a data storage node with data loss and having the intermediate disk number is first recovered, where an algorithm is simple and is easy to implement by using coding. In a case that data on a horizontal parity node and two data storage nodes is lost, one data storage node is first recovered, where the algorithm is simple and is easy to implement by using coding, and the recovered data on the data storage node can be sent to a user first, and the data on the horizontal parity nodes is concurrently recovered, thereby reducing waiting time for the user and improving user experience.

Embodiment 2

Figure 2A:
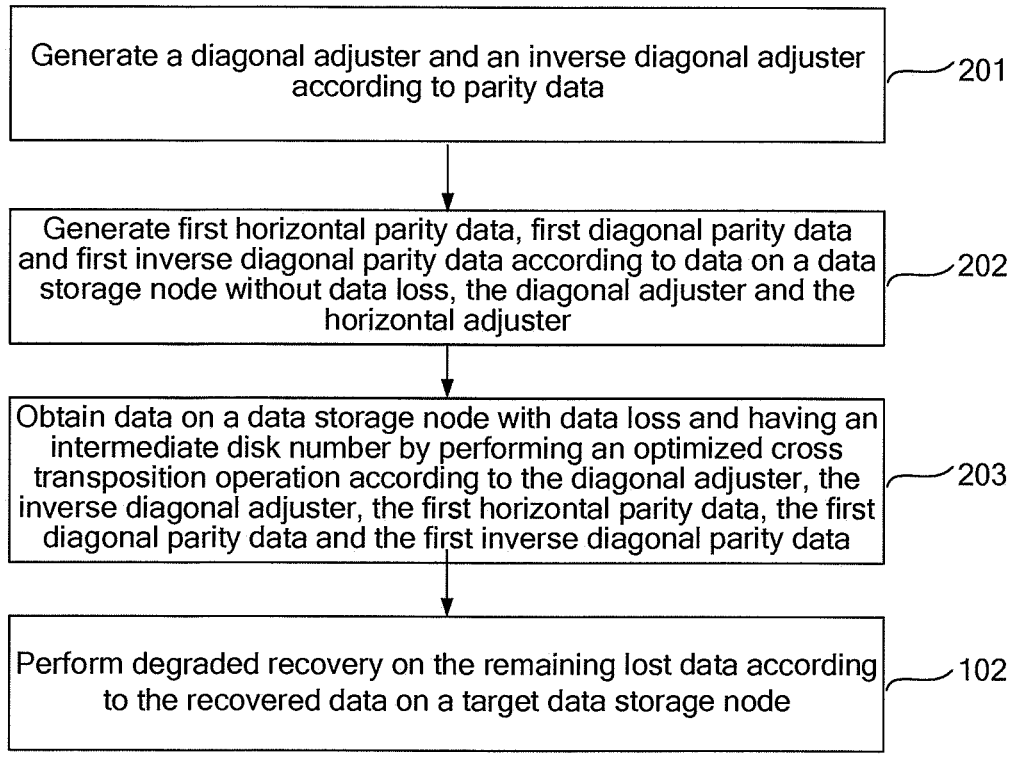
FIG. 2a is a flowchart of a data offloading method according to Embodiment 2 of the present invention.

FIG. 2a is a flowchart of a data offloading method of Embodiment 2 of the present invention; steps in FIG. 2a having the same numbers as those in FIG. 1a have the same meanings. For brevity, detailed descriptions of these components are omitted. As shown in FIG. 2a, a difference between this embodiment and the foregoing embodiment are as follows: in case 1 described in the foregoing embodiment, in a case that the lost data of the three nodes include data of three data storage nodes, the recovering data on a target data storage node of the data on the three nodes according to the data on a parity node and a data storage node without data loss in step 101 may specifically include the following steps:

Step 201: Generate a diagonal adjuster and an inverse diagonal adjuster according to parity data, where the parity data includes data on a horizontal parity node, a diagonal parity node and an inverse diagonal parity node.

Specifically, it is assumed that data on data storage nodes r,s,t is lost, where $0 \leq r < s < t < p' \leq p$. Then, a main idea is to recover the intermediate node first by using cross transposition combination. A formula (1.1) and a formula (1.2) may be adopted to generate an adjuster (adjuster). Referring to the formula (1.1), an adjuster of the diagonal parity node may be called the diagonal adjuster for short; and referring to the formula (1.2), an adjuster of the inverse diagonal parity node may be called the inverse diagonal adjuster for short.

$$Q_s = \bigoplus_{i=0}^{p-2}(P_i \oplus Q_i) \quad (1.1)$$

$$R_s = \bigoplus_{i=0}^{p-2}(P_i \oplus R_i) \quad (1.2)$$

In the formulas (1.1) and (1.2), $Q_s$ is the diagonal adjuster, $R_s$ is the inverse diagonal adjuster, $P_i$ is data of the $i^{th}$ stripe unit on the horizontal parity node, $Q_i$ is data of the $i^{th}$ stripe unit on the diagonal parity node, $R_i$ is data of the $i^{th}$ stripe unit of the inverse diagonal parity node, $0 \leq i \leq p-2$, and P is a prime number greater than or equal to a quantity p' of the data storage nodes.

Step 202: Generate first horizontal parity data, first diagonal parity data and first inverse diagonal parity data according to data on the data storage node without data loss, the diagonal adjuster and the inverse diagonal adjuster.

Specifically, formulas (1.3) to (1.5) may be adopted to generate new parity data. The formula (1.3) is adopted to generate the first horizontal parity data; the formula (1.4) is adopted to generate the first diagonal parity data; and the formula (1.5) is adopted to generate the first inverse diagonal parity data;

$$P'_i = P_i \oplus \left(\bigoplus_{\substack{j=0 \\ j \neq r,s,t}}^{p'-1} D_{i,j}\right) \quad (1.3)$$

$$Q'_i = Q_S \oplus Q_i \oplus \left(\bigoplus_{\substack{j=0 \\ j \neq r,s,t}}^{p'-1} D_{\langle i-j \rangle_p, j}\right) \quad (1.4)$$

$$R'_i = R_S \oplus R_i \oplus \left(\bigoplus_{\substack{j=0 \\ j \neq r,s,t}}^{p'-1} D_{\langle i+j \rangle_p, j}\right) \quad (1.5)$$

In formulas (1.3) to (1.5), $P_i'$ is the first horizontal parity data, $Q_i'$ is the first diagonal parity data, $R_i'$ is the first inverse diagonal parity data, $D_{i,j}$ is data of the $i^{th}$ stripe unit on a data storage node in the $j^{th}$ row, r, s, and t are disk numbers of the data storage nodes with data loss, p' is the quantity of the data storage nodes, $0 \leq j \leq p'-1$, $0 \leq r < s < t < p' \leq p$, and $\langle \rangle_p$ is to perform a modulus operation on p.

Step 203: Obtain the data on the data storage node with data loss and having an intermediate disk number by performing an optimized cross transposition operation according to the diagonal adjuster, the inverse diagonal adjuster, the first horizontal parity data, the first diagonal parity data and the first inverse diagonal parity data.

Figure 2B:
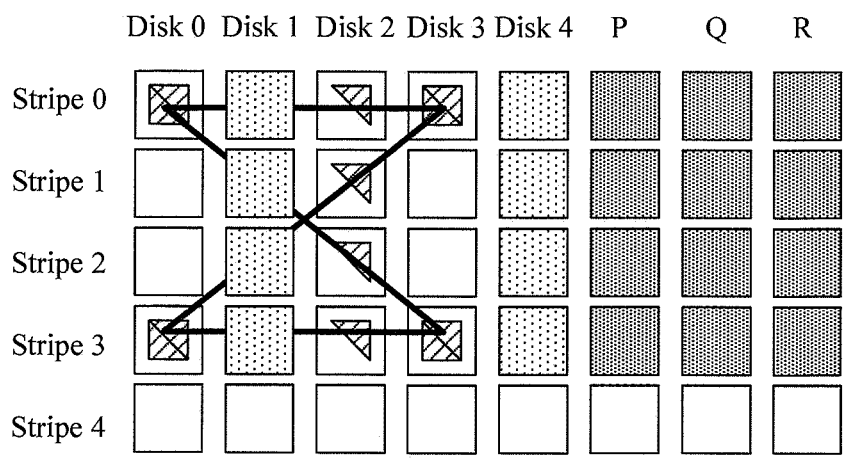
FIG. 2b is a schematic diagram of a cross transposition operation in the data offloading method according to Embodiment 2 of the present invention.

Specifically, FIG. 2b is a schematic diagram of a cross transposition operation in a data offloading method of Embodiment 2 of the present invention. As shown in FIG. 2b, a stripe unit that a cross transposition line passes by for an odd number of times includes a triangle, and a stripe unit that a cross transposition line passes by for an even number of times includes a square (formed by two triangles); the data of the stripe units on the data storage node are symmetric; and an intersecting node including a square can be eliminated during a process of performing an XOR operation. For example, an XOR operation performed on data of stripe units on all the data storage nodes that two lines of $D_{0,0}$ pass by is equivalent to eliminating the $D_{0,0}$. Therefore, a formula (1.6) of the data storage node with data loss and having the intermediate disk number may be created by using the cross transposition operation:

$$A_d = D_{d,s} \oplus D_{\langle d+a \rangle_p, s} \oplus D_{\langle d+b \rangle_p, s}$$
$$\oplus D_{\langle d+a+b \rangle_p, s} = P'_{\langle d \rangle_p} \oplus P'_{\langle d+a+b \rangle_p}$$
$$\oplus R'_{\langle d-r \rangle_p} \oplus Q'_{\langle d+t \rangle_p} \quad (1.6)$$

In the formula (1.6), $0 \leq d \leq p-1$; s is a disk number of the data storage node with data loss and having the intermediate disk number; and a and b are disk number differences between the three data storage nodes with data loss, where a=s−r, b=t−s.

Then, after elimination is performed on the formula of the data storage node with data loss and having the intermediate disk number according to a shift step size and a quantity of cyclic XOR sum times determined according to the disk number differences between the data storage nodes with data loss, the data of the stripe units on all the data storage nodes with data loss is transformed into an XOR sum of data of two stripe units on the data storage node with data loss and having the intermediate disk number, to obtain data on the data storage node with data loss and having the intermediate disk number. The specific manner of performing the elimination may include:

Usually, a common cross transposition operation may include: adopting a step size b to perform XOR sum for k times on the formula of the data storage node with data loss and having the intermediate disk number, to obtain a formula (1.7) of the data storage node with data loss and having the intermediate disk number:

$$D_{u,s} \oplus D_{\langle u+2a \rangle_p, s} \quad (1.7)$$

Figure 2C:
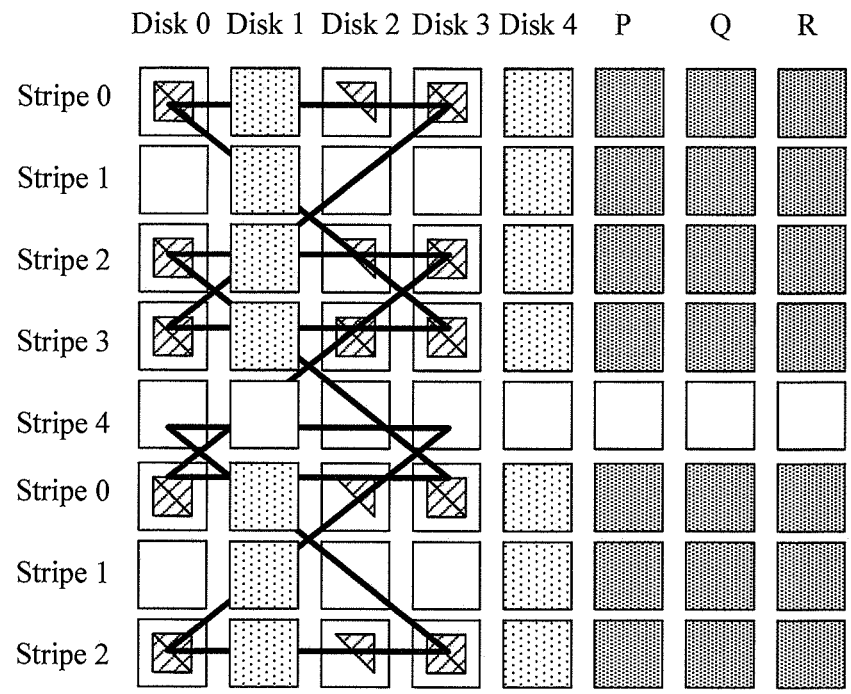
FIG. 2c is a schematic diagram of performing a cyclic XOR sum according to a step size in the data offloading method according to Embodiment 2 of the present invention.

In the formula (1.7), k is determined according to $\langle a-k \times b \rangle_p = 0$. FIG. 2c is a schematic diagram of performing a cyclic XOR sum according to a step size in the data offloading method of Embodiment 2 of the present invention. As shown in FIG. 2c, by using b=2, k=3 as an example, the elimination can be performed on a data storage node having a disk number of "2", where after 3 times of XOR sum are performed along four cross transposition lines according to a step size of 2, stripe units $D_{1,2}$, $D_{3,2}$, $D_{4,2}$ that the cross transposition lines pass by for an even number of times are eliminated, thereby obtaining an XOR sum formula of $D_{0,2}$ and $D_{2,2}$ that only include two variables. An XOR sum formula between data of the stripe units in pairs on the data storage node having a disk number of "2" can be obtained in a similar way.

The optimized cross transposition operation may specifically include: adopting a step size offDis to perform XOR sum for k times on the formula of the data storage node with data loss and having the intermediate disk number; if k exists, make $<\min Dis-k \times offDis>_p=0$, and shift for k times (that is, performing XOR sum for k times) at the step size offDis, thereby obtaining a formula (1.8) of the data storage node with data loss and having the intermediate disk number:

$$D_{u,s} \oplus D_{\langle u+2minDis\rangle_p,s} = \sum_{v=0}^{k-1} A_{\langle u+v \times offDis\rangle_p} \quad (1.8)$$

k can be determined according to a formula (1.9):

$$\begin{cases} \langle b - m \times a \rangle_p = 0 \\ \langle a - n \times b \rangle_p = 0 \\ k = \min\{m, n\} \end{cases} \quad (1.9)$$

Figure 2D:
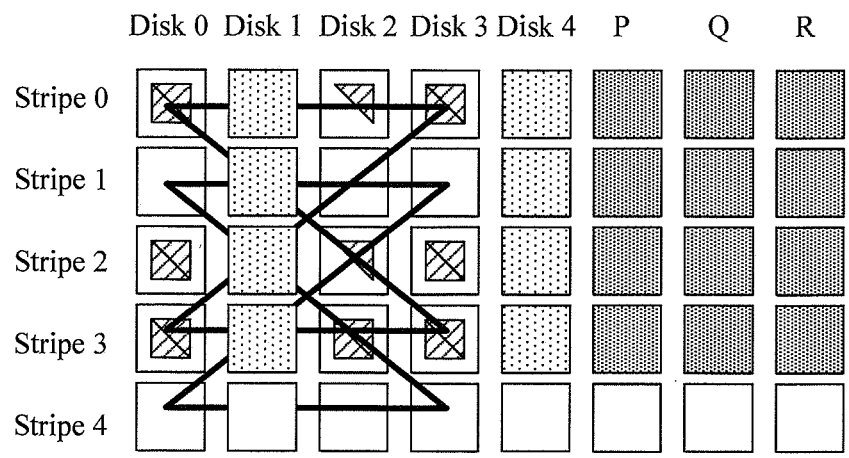
FIG. 2d is a schematic diagram of performing a cyclic XOR sum according to an optimized step size in the data offloading method according to Embodiment 2 of the present invention.

If k=m, then min Dis=b, offDis=a; otherwise, min Dis=a, offDis=b, $<u+v \times offDis>_p=d$, $0 \le u \le p-1$. $A_d$ is an XOR sum of data on a data storage node that four cross transposition lines pass by in the foregoing formula (1.6). After an optimal k is solved, the data of an intermediate node is first recovered. For example, if a=2, b=1, it can be obtained that k=2, and XOR is performed at a step size of offDis=b=1. FIG. 2d is a schematic diagram of performing a cyclic XOR sum according to an optimized step size in the data offloading method of Embodiment 2 of the present invention. As shown in FIG. 2d, after XOR sum is performed twice according to a step size of 1, $D_{1,2}$, $D_{2,2}$, and $D_{3,2}$ can be eliminated, thereby obtaining an XOR formula of $D_{0,2}$ and $D_{4,2}$ that only includes two variables. An XOR sum formula between data of the stripe units in pairs on the data storage node having a disk number of "2" can be obtained in a similar way.

A cyclic equation set obtained according to the formula of the data storage node with data loss and having the intermediate disk number is used to represent an XOR sum of two pieces of data on the intermediate data storage node, and each formula in the cyclic equation set at most has two variables.

Further, the obtaining data on the data storage node with data loss and having the intermediate disk number may specifically include: substituting virtually-zero-filled data $D_{p-1,s}=0$ of a stripe unit on the data storage node with data loss and having the intermediate disk number into a formula having only one variable in the cyclic equation set for a solution, solving other formulas in the cyclic equation set in sequence according to a result of the solution, and obtaining each piece of data on the data storage node with data loss and having the intermediate disk number.

Figure 2E:
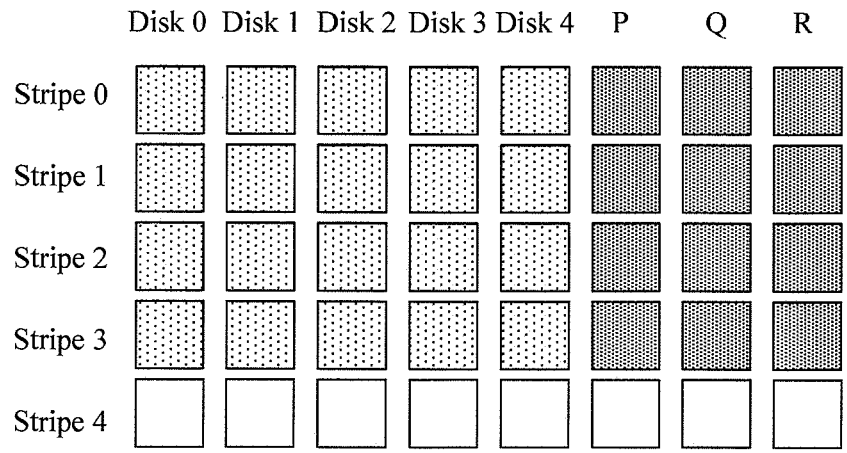
FIG. 2e is a structural schematic diagram of data storage of a data recovery method according to Embodiment 2 of the present invention.

FIG. 2e is a structural schematic diagram of data storage in a data recovery method of Embodiment 2 of the present invention. As shown in FIG. 2e, by using 5 data storage nodes with disk numbers from 0 to 4 as an example, 3 parity nodes P, Q and R are generated, and there are totally 8 nodes; each node is divided into 4 strips of a same size, where the fifth stripe (black solid circle having a row number 4 in the diagram) is a virtually-zero-filled stripe; a disk number of a horizontal parity node generated according to the five data storage nodes may be "5", a disk number of a diagonal parity node may be "6", and a disk number of an inverse diagonal parity node may be "7". For a generation manner of the horizontal parity node P (parity I), reference may be made to FIG. 1b; for a generation manner of the diagonal parity node Q (parity II), reference may be made to FIG. 1c; and a generation manner of the inverse diagonal parity node R (parity III), reference may be made to FIG. 1d.

For case 1, as shown in FIG. 2d, it is assumed that nodes "0, 2 and 3" are lost, and a specific process of recovering data on the three data storage nodes according to the data recovery method in this embodiment may include:

Perform step 201 to calculate an adjuster of the diagonal parity node Q and an adjuster of the inverse diagonal parity node R, where a formula (1.1.0) and a formula (1.2.0) can be obtained according to the formula (1.1) and the formula (1,2):

$$Q_s = P_0 \oplus P_1 \oplus P_2 \oplus P_3 \oplus Q_0 \oplus Q_1 \oplus Q_2 \oplus Q_3 \oplus \quad (1.1.0)$$

$$R_s = P_0 \oplus P_1 \oplus P_2 \oplus P_3 \oplus R_0 \oplus R_1 \oplus R_2 \oplus R_3 \oplus \quad (1.2.0)$$

Perform step 202 to calculate parity data of the horizontal parity node P, the diagonal parity node Q and the inverse diagonal parity node R, where a formula set (1.3.0) of the first horizontal parity data can be obtained according to the formula (1.3), a formula set (1.4.0) of the first diagonal parity data can be obtained by substituting the formula (1.1.0) into the formula (1.4), and a formula set (1.5.0) of the first inverse diagonal parity data can be obtained by substituting the formula (1.2.0) into the formula (1.5).

$$\begin{cases} P'_0 = D_{0,1} \oplus D_{0,4} \oplus P_0 \\ P'_1 = D_{1,1} \oplus D_{1,4} \oplus P_1 \\ P'_2 = D_{2,1} \oplus D_{2,4} \oplus P_2 \\ P'_3 = D_{3,1} \oplus D_{3,4} \oplus P_3 \\ P'_4 = 0 \end{cases} \quad (1.3.0)$$

$$\begin{cases} Q'_0 = D_{1,4} \oplus Q_s \oplus Q_0 \\ Q'_1 = D_{0,1} \oplus D_{2,4} \oplus Q_s \oplus Q_1 \\ Q'_2 = D_{1,1} \oplus D_{3,4} \oplus Q_s \oplus Q \\ Q'_3 = D_{2,1} \oplus Q_s \oplus Q_3 \\ Q'_4 = D_{3,1} \oplus D_{0,4} \oplus Q_s \end{cases} \quad (1.4.0)$$

$$\begin{cases} R'_0 = D_{1,1} \oplus R_s \oplus R_0 \\ R'_1 = D_{2,1} \oplus D_{0,4} \oplus R_s \oplus R_1 \\ R'_2 = D_{3,1} \oplus D_{1,4} \oplus R_s \oplus R_2 \\ R'_3 = D_{2,4} \oplus R_s \oplus R_3 \\ R'_4 = D_{0,1} \oplus D_{3,4} \oplus R_s \end{cases} \quad (1.5.0)$$

Perform step 203 to determine a minimum number k of XOR sum times and a step size offDis. The disk number differences between the nodes with data loss are that a=0−2=2, b=3−2=1, $<1-m \times 2>_5=0$, $<2-n \times 1>_5=0$, m=3, n=2, k=min{m,n}=2, can be obtained by substituting the disk number differences between the nodes with data loss into the formula (1.9). Therefore, the quantity of XOR sum times is k=2, and the step size is offDis=b=1. The recovery manner determined according to FIG. 2b complies with the formula (1.8), and the formula sets (1.3.0), (1.4.0) and (1.5.0) can be substituted into the formula (1.8) to obtain a formula (1.8.0).

$$D_{u,2} \oplus D_{\langle u+2\times 2\rangle_5,2} = \qquad (1.8.0)$$
$$\sum_{v=0}^{k-1} P'_{\langle u+v\times 1\rangle_5} \oplus P'_{\langle u+2+1+v\times 1\rangle_5} \oplus R'_{\langle u-0+v\times 1\rangle_5} \oplus Q'_{\langle u+3+v\times 1\rangle_5}$$

Because of 0≤u≤p−1, the formula (1.8.0) can be expanded as a cyclic equation set (1.8.1), including the XOR sums of p−1=4 pairs of data, where each formula is an XOR sum of one pair of data having the disk number of "2".

$$\begin{cases} D_{0,2} \oplus D_{4,2} = P'_0 \oplus P'_3 \oplus R'_0 \oplus Q'_3 \oplus P'_1 \oplus P'_4 \oplus R'_1 \oplus Q'_4 \\ D_{1,2} \oplus D_{0,2} = P'_1 \oplus P'_4 \oplus R'_1 \oplus Q'_4 \oplus P'_2 \oplus P'_0 \oplus R'_2 \oplus Q'_0 \\ D_{2,2} \oplus D_{1,2} = P'_2 \oplus P'_0 \oplus R'_2 \oplus Q'_0 \oplus P'_3 \oplus P'_1 \oplus R'_3 \oplus Q'_1 \\ D_{3,2} \oplus D_{2,2} = P'_3 \oplus P'_1 \oplus R'_3 \oplus Q'_1 \oplus P'_4 \oplus P'_2 \oplus R'_4 \oplus Q'_2 \end{cases} \qquad (1.8.1)$$

Because data of the $D_{4,2}$ stripe unit is zero, $D_{0,2}$ in the first formula in the cyclic equation set (1.8.1) can be first calculated, and then $D_{1,2}$ in the second formula can be calculated according to $D_{0,2}$, so as to calculate the data on the data storage node having a disk number of "2" one by one. Then, a degraded form such as EVENODD can be performed to recover the data on the data storage nodes having a disk number of "0" and "3".

According to the embodiment of the present invention, parity data is used to perform data recovery, which can ensure effective utilization of a storage space in a distributed system, so as to meet a performance requirement of the distributed storage system; in a case that data on three nodes is lost, a target data storage node first recovered is determined according to symmetry of the lost data, and the lost data on the three nodes is recovered according to parity data and data that is not lost, which can improve the data recovery performance of the distributed storage system; in a case that data on three data storage nodes is lost, a data storage node with data loss and having an intermediate disk number is first recovered; moreover, a quantity of cyclic XOR sum times k can be obtained only by using a simple math formula, and the quantity of XOR times is small during recovery, which further saves required cloud storage processing memory, and an algorithm is simple and easy to implement by using coding.

Embodiment 3

Figure 3A:
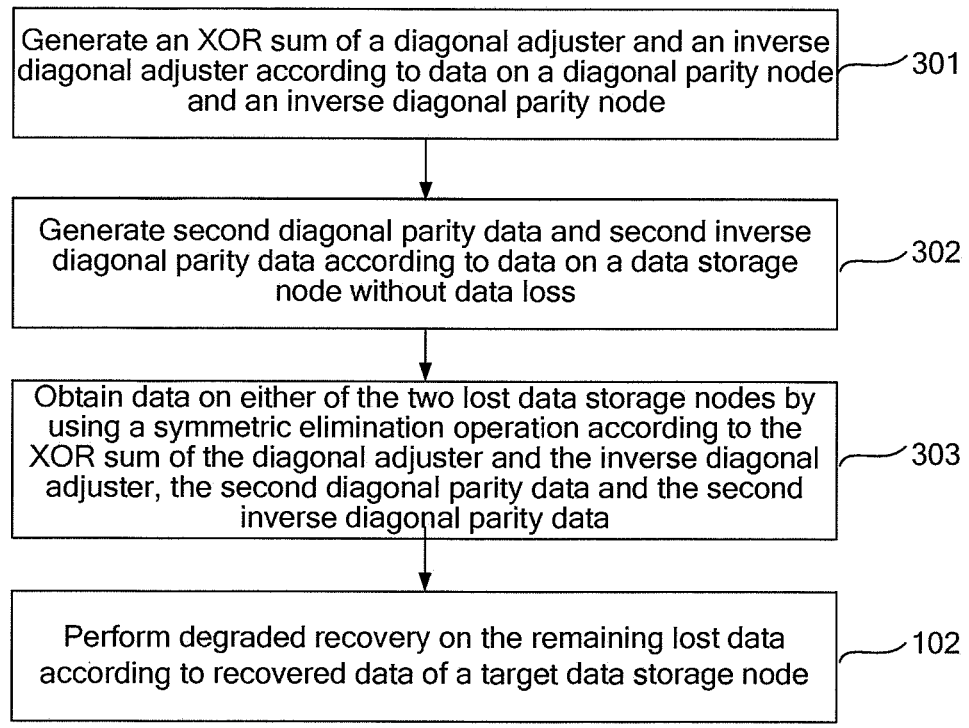
FIG. 3a is a flowchart of a data offloading method according to Embodiment 3 of the present invention.

FIG. 3a is a flowchart of a data offloading method of Embodiment 3 of the present invention. The steps in FIG. 3a having the same numbers as those in FIG. 1a have the same meanings. For brevity, detailed descriptions of these components are omitted. As shown in FIG. 3a, a difference between this embodiment and the foregoing embodiment is as follows: in case 2 described in the foregoing embodiment, in a case that the lost data on the three nodes includes data on a horizontal parity node and two data storage nodes, the recovering data on a target data storage node of the data on the three nodes according to data on a parity node and a data storage node without data loss in step 101 may specifically include the following steps:

Step 301: In the case that the lost data on the three nodes includes data on a horizontal parity data and two data storage nodes, generate an XOR sum of a diagonal adjuster and an inverse diagonal adjuster according to data on a diagonal parity node and an inverse diagonal parity node.

Specifically, it is assumed that data storage nodes r,s,p are lost, where 0≤r<s<p'≤p, a=s−r, and a formula (2.1) can be adopted to generate the XOR sum of the diagonal adjuster and the inverse diagonal adjuster:

$$Q_S \oplus R_S = \left(\bigoplus_{i=0}^{p-2} Q_i\right) \oplus \left(\bigoplus_{i=0}^{p-2} R_i\right) \qquad (2.1)$$

$Q_s$ is the diagonal adjuster, $R_s$ is the inverse diagonal adjuster, $Q_i$ is data of the $i^{th}$ stripe unit on the diagonal parity node, $R_i$ is data of the $i^{th}$ stripe unit on the inverse diagonal parity node, 0≤i≤p−2, p is a disk number of the lost horizontal parity data, and p is a prime number greater than or equal to a quantity of the data storage nodes.

Step 302: Generate second diagonal parity data and second inverse diagonal parity data according to the data on the data storage node without data loss.

Specifically, a formula (2.2) and a formula (2.3) may be adopted to generate new parity data, where the formula (2.2) is adopted to generate the second diagonal parity data and the formula (2.3) is adopted to generate the second inverse diagonal parity data:

$$Q'_i = Q_i \oplus \left(\bigoplus_{\substack{j=0 \\ j\neq r,s}}^{p'-1} D_{\langle i-j\rangle_p, j}\right) \qquad (2.2)$$

$$R'_i = R_i \oplus \left(\bigoplus_{\substack{j=0 \\ j\neq r,s}}^{p'-1} Q_i D_{\langle i+j\rangle_p, j}\right) \qquad (2.3)$$

$Q_i'$ is the second diagonal parity data, $R_i'$ is the second inverse diagonal parity data, $D_{i,j}$ is data of the $j^{th}$ stripe unit on a data storage node in the $j^{th}$ row, r and s are disk numbers of the data storage nodes with data loss, p' is the quantity of the data storage nodes, 0≤j≤p'−1, 0≤r<s<p'≤p, and $<>_p$ is to perform a modulus operation on p.

Step 303: Obtain data on either of the two data storage nodes with data loss by performing a symmetric elimination operation according to the XOR sum of the diagonal adjuster and the inverse diagonal adjuster, the second diagonal parity data and the second inverse diagonal parity data.

Specifically, the following manners may be included:

Manner 1: Firstly, recover lost data on a data storage node in the $s^{th}$ row.

According to a created lost data formula (2.4):

$$D_{u,s} \oplus D_{\langle u+2(s-r)\rangle_p,s} \oplus Q_s \oplus R_s = Q_{\langle u+s\rangle_p}' \oplus R_{\langle u+s-2r\rangle_p}' \qquad (2.4)$$

A formula (2.5) can be obtained by performing elimination on the formula (2.4):

$$D_{u,s} \oplus D_{\langle u+2(s-r)\rangle_p,s} = Q_{\langle u+s\rangle_p}' \oplus R_{\langle u+s-2r\rangle_p}' \oplus Q_s \oplus R_s \qquad (2.5)$$

Then, obtain the lost data on the data storage node in the $s^{th}$ row according to virtually-zero-filled data $D_{p-1,s}=0$ of the stripe unit.

Manner 2: Firstly, recover lost data on a data storage node in the $r^{th}$ row.

According to a created lost data formula (2.6):

$$D_{u,r} \oplus D_{<u+2(s-r)>_p,r} \oplus Q_s \oplus R_s = Q_{<u+2s-r>_p} 40 \oplus R_{<u-r>_p} \quad (2.6)$$

A formula (2.7) can be obtained by performing elimination on the formula (2.6):

$$D_{u,r} \oplus D_{<u+2(s-r)>_p,r} = Q_{<u+2s-r>_p}' \oplus R_{<u-r>_p}' \oplus Q_s R_s \quad (2.7)$$

Then, obtain the lost data on the data storage node in the $r^{th}$ row according to virtually-zero-filled data $D_{p-1,s}=0$ of the stripe unit.

Figure 3B:
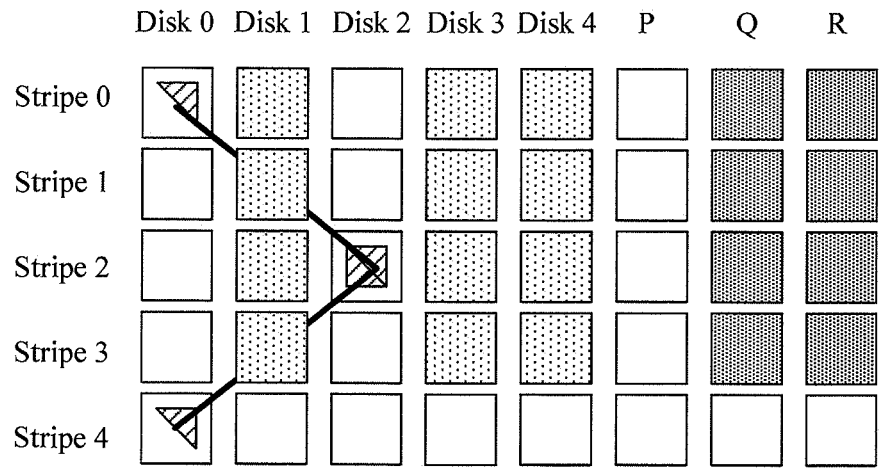
FIG. 3b is a schematic diagram of symmetric elimination in the data offloading method according to Embodiment 3 of the present invention.

Either s or r may be first recovered. FIG. 3b is a schematic diagram of symmetric elimination in the data offloading method of Embodiment 3 of the present invention. As shown in FIG. 3b, a row labeled as stripe unit data "4" in a column of numbers on the left side is a virtually-zero-filled row. For case 2, it is assumed that data on the data storage nodes having a disk number of "1" and "3" and the horizontal parity node P is lost, the data recovery method according to the embodiment of the present invention may specifically include:

Perform step 301 and calculate an XOR sum of an adjuster of a diagonal parity node Q and an adjuster of an inverse diagonal parity node R, where a formula (2.1.0) can be obtained according to the formula (2.1):

$$Q_S \oplus R_S = Q_0 \oplus Q_1 \oplus Q_2 \oplus Q_3 \oplus R_0 \oplus R_1 \oplus R_2 \oplus R_3, \quad (2.1.0)$$

Perform step 302 and calculate parity data of the diagonal parity node Q and the inverse diagonal parity node R, where a formula set (2.2.0) of second diagonal parity data can be obtained according to the formula (2.2), and a formula set (2.3.0) of first inverse diagonal parity data can be obtained according to the formula (2.3).

$$\begin{cases} Q_0' = D_{0,0} \oplus D_{3,2} \oplus D_{1,4} \oplus Q_0 \\ Q_1' = D_{1,0} \oplus D_{4,2} \oplus Q_1 \\ Q_2' = D_{2,0} \oplus D_{0,2} \oplus D_{3,4} \oplus Q_2 \\ Q_3' = D_{3,0} \oplus D_{1,2} \oplus Q_3; \\ Q_4' = D_{2,2} \oplus D_{0,4} \end{cases} \quad (2.2.0)$$

$$\begin{cases} R_0' = D_{0,0} \oplus D_{2,2} \oplus R_0 \\ R_1' = D_{1,0} \oplus D_{3,2} \oplus D_{0,4} \oplus R_1 \\ R_2' = D_{2,0} \oplus D_{1,4} \oplus R_2 \\ R_3' = D_{3,0} \oplus D_{0,2} \oplus D_{2,4} \oplus R_3 \\ R_4' = D_{1,2} \oplus D_{3,4} \end{cases} \quad (2.3.0)$$

Perform step 303. Referring to FIG. 3b, perform elimination on the formula (2.4) to obtain the formula (2.5), where a cyclic equation set (2.5.0) can be obtained by using the formula (2.5). For example, by performing an XOR operation on an intersecting point of two lines, $D_{3,1}$ can be eliminated, to obtain an XOR sum formula of $D_{1,3}$, $D_{0,3}$. Referring to the second formula of the following cyclic equation set (2.5.0), all the formulas in the cyclic equation set (2.5.0) can be obtained in this manner.

$$\begin{cases} D_{0,3} \oplus D_{4,3} = Q_3' \oplus R_1' \oplus Q_s \oplus R_s \\ D_{1,3} \oplus D_{0,3} = Q_4' \oplus R_2' \oplus Q_s \oplus R_s \\ D_{2,3} \oplus D_{1,3} = Q_0' \oplus R_3' \oplus Q_s \oplus R_s \\ D_{3,3} \oplus D_{2,3} = Q_1' \oplus R_4' \oplus Q_s \oplus R_s \end{cases} \quad (2.5.0)$$

Because data of the stripe unit $D_{4,3}$ is zero, data of the stripe units $D_{0,3}$, $D_{1,3}$, $D_{2,3}$, $D_{3,3}$ can be calculated one by one, to recover data on the data storage node having a disk number of "3". Further, data on the data storage node having a disk number of "1" is further recovered, and lastly, data on the horizontal parity node P is recovered.

Certainly, according to the formula (2.7), the data on the data storage node having the disk number of "1" may be first recovered, then, the data on the data storage node having the disk number of "3" may be recovered, and lastly, the data on the horizontal parity node P may be recovered.

According to the embodiment of the present invention, parity data is used to perform data recovery, which can ensure effective utilization of a storage space in a distributed system, so as to meet a performance requirement of the distributed storage system; in a case that data on three nodes is lost, a target data storage node first recovered is determined according to symmetry of the lost data, and the lost data on the three nodes is recovered according to parity data and data that is not lost, which can improve data recovery performance of the distributed storage system; in a case that data on a horizontal parity node and two data storage nodes is lost, one data storage node is first recovered, where an algorithm is simple and is easy to implement by using coding, and recovery performance is higher than that of first recovering the horizontal parity node; and, the recovered data storage node may also be sent to a user first, and the data on the horizontal parity nodes is concurrently recovered, thereby reducing waiting time for the user and improving user satisfaction.

Embodiment 4

Figure 4:
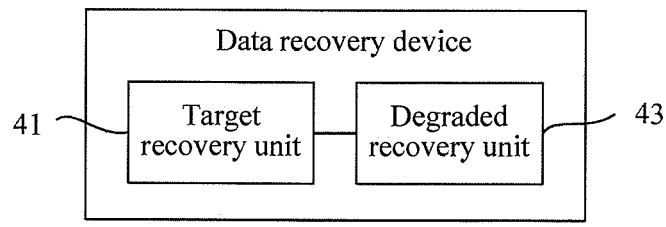
FIG. 4 is a structural block diagram of a data recovery device according to Embodiment 4 of the present invention.

FIG. 4 is a structural block diagram of a data recovery device of Embodiment 4 of the present invention. As shown in FIG. 4, the data recovery device may include:

a target recovery unit 41, configured to, in a case that a distributed storage system loses data on three nodes, recover data on a target data storage node of the data on the three nodes according to data on a parity node and a data storage node without data loss, where the target data storage node is determined according to symmetry of the lost data; and a degraded recovery unit 43, configured to perform degraded recovery on the remaining lost data according to the recovered data on the target data storage node.

Specifically, the distributed system or RAID may include a plurality of data storage nodes and parity nodes, where each data storage node may be divided into a plurality of stripe units. A quantity of the stripe units is generally greater than or equal to a quantity of the data storage nodes. For details, reference may be made to relevant descriptions in the data recovery method of the embodiments of the present invention. Referring to FIG. 1b to FIG. 1d, the parity nodes may include a horizontal parity node, a diagonal parity node and an inverse diagonal parity node, or may further include a parity node with a slope of "2", a parity node with a diagonal of "−2", and the like.

According to the embodiment of the present invention, parity data is used to perform data recovery, which can ensure effective utilization of a storage space in a distributed system, so as to meet a performance requirement of the distributed storage system; and in a case that data on three nodes is lost, a target data storage node first recovered is determined according to symmetry of the lost data, and the lost data on the three nodes is recovered according to parity data and data that is not lost, which can improve data recovery performance of the distributed storage system.

Embodiment 5

Figure 5:
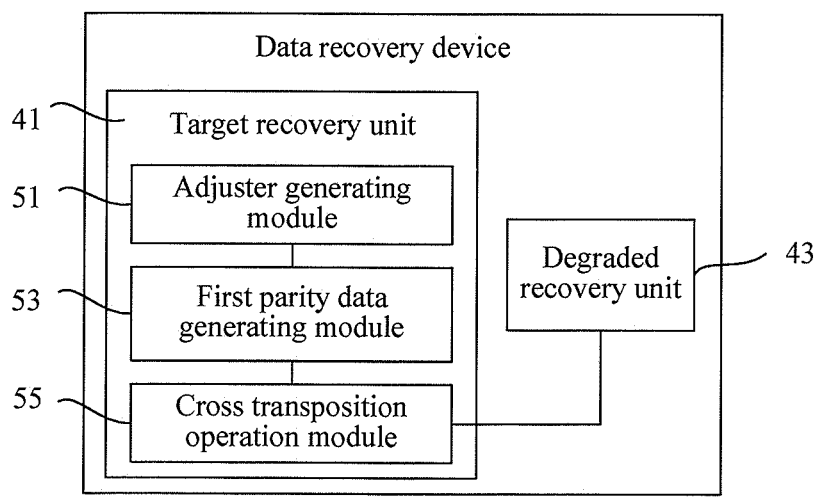
FIG. 5 is a structural block diagram of a data recovery device according to Embodiment 5 of the present invention.

FIG. 5 is a structural block diagram of a data recovery device of Embodiment 5 of the present invention. A same component in FIG. 5 and FIG. 4 has same meanings, and differences between this embodiment and the foregoing embodiments are as follows:

As shown in FIG. 5, in a case that the lost data on three nodes includes data on three data storage nodes, the target data storage node is a data storage node with data loss and having an intermediate disk number; and the target recovery unit 41 of the data recovery device includes:

an adjuster generating module 51, configured to generate a diagonal adjuster and an inverse diagonal adjuster according to parity data, where the parity data includes data on a horizontal parity node, a diagonal parity node and an inverse diagonal parity node;

a first parity data generating module 53, configured to generate first horizontal parity data, first diagonal and first inverse diagonal parity data according to data on the data storage node without data loss, the diagonal adjuster and the inverse diagonal adjuster; and a cross transposition operation module 55, configured to obtain data on the data storage node with data loss and having an intermediate disk number by performing an optimized cross transposition operation according to the diagonal adjuster, the inverse diagonal adjuster, the first horizontal parity data, the first diagonal parity data and the first inverse diagonal parity data.

In one possible implementation manner, the adjuster generating module 51 may be specifically configured to:

generate the diagonal adjuster by using a formula $$Q_s = \bigoplus_{i=0}^{p-2}(P_i \oplus Q_i);$$

and
generate the inverse diagonal adjuster by using a formula $$R_s = \bigoplus_{i=0}^{p-2}(P_i \oplus R_i),$$

where:

$Q_s$ is the diagonal adjuster, $R_S$ is the inverse diagonal adjuster, $P_i$ is data of the $i^{th}$ stripe unit on the horizontal parity node, $Q_i$ is data of the $i^{th}$ stripe unit on the diagonal parity node, $R_i$ is data of the $i^{th}$ stripe unit on the inverse diagonal parity node, $0 \le i \le p-2$, and p is a prime number greater than or equal to a quantity of the data storage nodes.

In one possible implementation manner, the first parity data generating module 53 may be specifically configured to:

generate the first horizontal parity data by using a formula $$P'_i = P_i \oplus \left(\bigoplus_{\substack{j=0 \\ j \ne r,s,t}}^{p'-1} D_{i,j}\right);$$

generate the first diagonal parity data by using a formula $$Q'_i = Q_s \oplus Q_i \oplus \left(\bigoplus_{\substack{j=0 \\ j \ne r,s,t}}^{p'-1} D_{\langle i-j \rangle_p, j}\right);$$

and
generate the first inverse diagonal parity data by using a formula $$R'_i = R_s \oplus R_i \oplus \left(\bigoplus_{\substack{j=0 \\ j \ne r,s,t}}^{p'-1} D_{\langle i+j \rangle_p, j}\right),$$

where:

$P_i'$ is the first horizontal parity data, $Q_i'$ is the first diagonal parity data, $R_i'$ is the first inverse diagonal parity data, $D_{i,j}$ is data of the $i^{th}$ stripe unit on a data storage node in the $j^{th}$ row, r, s, and t are disk numbers of the data storage nodes with data loss, p' is the quantity of the data storage nodes, $0 \le j \le p'-1$, $0 \le r < s < t < p' \le p$, and $\langle \ \rangle_p$ is to perform a modulus operation on p.

In one possible implementation manner, the cross transposition operation module 55 may be specifically configured to:

create a formula of the data storage node with data loss and having the intermediate disk number by performing a cross transposition operation:

$$A_d = D_{d,S} \oplus D_{\langle d+a \rangle_p,S} \oplus D_{\langle d+b \rangle_p,S}$$
$$\oplus D_{\langle d+a+b \rangle_p,S} = P'_{\langle d \rangle_p} \oplus P'_{\langle d+a+b \rangle_p}$$
$$\oplus R'_{\langle d-r \rangle_p} \oplus Q'_{\langle d+t \rangle_p},$$

where:

$0 \le d \le p-1$, s is a disk number of the data storage node with data loss and having the intermediate disk number; and a and b are disk number differences between the three data storage nodes with data loss, where a=s−r, b=t−s; and after performing elimination on the formula of the data storage node with data loss and having the intermediate disk number according to a shift step size and a quantity of cyclic XOR sum times determined according to the disk number differences between the data storage nodes with data loss, transform the data of the stripe units on all the data storage nodes with data loss into an XOR sum of data of two stripe units on the data storage node with data loss and having the intermediate disk number, and obtaining data on the data storage node with data loss and having the intermediate disk number.

In one possible implementation manner, the cross transposition operation module 55 may be further specifically configured to:

adopt a step size offDis to perform XOR sum for k times on the formula of the data storage node with data loss and having the intermediate disk number, to obtain a formula $$D_{u,s} \oplus D_{\langle u+2minDis \rangle_p,s} = \sum_{v=0}^{k-1} A_{\langle u+v \times offDis \rangle_p}$$

of the data storage node with data loss and having the intermediate disk number, where k is determined according to a formula $$\begin{cases} \langle b - m \times a \rangle_p = 0 \\ \langle a - n \times b \rangle_p = 0 \\ k = \min\{m, n\} \end{cases};$$

if k=m, then min Dis=b, offDis=a; otherwise, min Dis=a, offDis=b, $\langle u+v \times offDis \rangle_p = d$, and $0 \le u \le p-1$, where:

a cyclic equation set obtained according to the formula of the data storage node with data loss and having the intermediate disk number is used to represent an XOR sum of two pieces of data on the intermediate data storage node, and each formula in the cyclic equation set at most has two variables; and the obtaining data on the data storage node with data loss and having the intermediate disk number includes:

substituting virtually-zero-filled data $D_{p-1,s}=0$ of a stripe unit on the data storage node with data loss and having the intermediate disk number into a formula having only one variable in the cyclic equation set for a solution, solving other formulas in the cyclic equation set in sequence according to a result of the solution, and obtaining each piece of data on the data storage node with data loss and having the intermediate disk number.

According to the embodiment of the present invention, parity data is used to perform data recovery, which can ensure effective utilization of a storage space in a distributed system, so as to meet a performance requirement of the distributed storage system; in a case that data on three nodes is lost, a target data storage node first recovered is determined according to symmetry of the lost data, and the lost data of the three nodes is recovered according to parity data and data that is not lost, which can improve data recovery performance of the distributed storage system; and in a case that data on three data storage nodes is lost, a data storage node with data loss and having an intermediate disk number is first recovered, a quantity k of cyclic XOR sum times can be obtained only by using a simple math formula, and the quantity of XOR times during recovery is small, which further saves required cloud storage processing memory space, and an algorithm is simple and is easy to implement by using coding.

Embodiment 6

Figure 6:
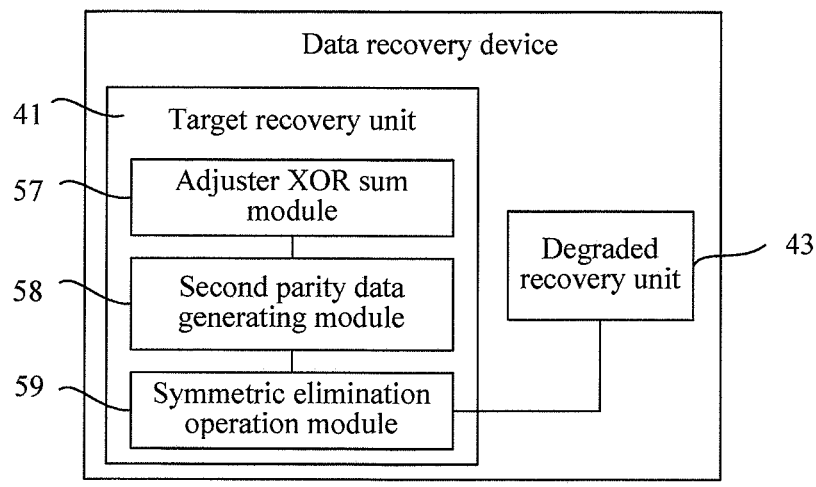
FIG. 6 is a structural block diagram of a data recovery device according to Embodiment 6 of the present invention.

FIG. 6 is a structural block diagram of a data recovery device of Embodiment 6 of the present invention. A same components in FIG. 6 and FIG. 4 has same meanings, and differences between this embodiment and the foregoing embodiments are as follows:

As shown in FIG. 6, in a case that the lost data on the three nodes includes data on a horizontal parity node and two data storage nodes, the target recovery unit 41 of the data recovery device may include:

an adjuster XOR sum module 57, configured to generate an XOR sum of a diagonal adjuster and an inverse diagonal adjuster according to data on the diagonal parity node and the inverse diagonal parity node;

a second parity data generating module 58, configured to generate second diagonal parity data and second inverse diagonal parity data according to data on the data storage node without data loss; and a symmetric elimination operation module 59, configured to obtain data on either of the two data storage nodes with data loss by performing a symmetric elimination operation according to the XOR sum of the diagonal adjuster and the inverse diagonal adjuster, the second diagonal parity data and the second inverse diagonal parity data.

In one possible implementation manner, the adjuster XOR sum module 57 may be specifically configured to: generate the XOR sum of the diagonal adjuster and the inverse diagonal adjuster by using a formula $$Q_S \oplus R_S = \left(\bigoplus_{i=0}^{p-2} Q_i\right) \oplus \left(\bigoplus_{i=0}^{p-2} R_i\right),$$

where $Q_s$ is the diagonal adjuster, $R_s$ is the inverse diagonal adjuster, $Q_i$ is data of the $i^{th}$ stripe unit on the diagonal parity node, $R_i$ is data of the $i^{th}$ stripe unit on the inverse diagonal parity node, p is a disk number of the lost horizontal parity data, and p is a prime number greater than or equal to a quantity of the data storage nodes.

The second parity data generating module 58 includes:

generate the second diagonal parity data by using a formula $$Q_i' = Q_i \oplus \left(\bigoplus_{\substack{j=0 \\ j \ne r,s}}^{p'-1} D_{\langle i-j \rangle_p, j}\right);$$

and generate the second inverse diagonal parity data by using a formula $$R_i' = R_i \oplus \left(\bigoplus_{\substack{j=0 \\ j \ne r,s}}^{p'-1} D_{\langle i+j \rangle_p, j}\right),$$

where:

$Q_i'$ is the second diagonal parity data, $R_i'$ is the second inverse diagonal parity data, $D_{i,j}$ is data of the $i^{th}$ stripe unit of a data storage node in the $j^{th}$ row, r and s are disk numbers of the data storage nodes with data loss, $0 \le j \le p'-1$, $0 \le r < s < p' \le p$, and $\langle \ \rangle_p$ is to perform a modulus operation on p.

In one possible implementation manner, the symmetric elimination operation module 59 may be specifically configured to:

transform the data of the stripe units on the two data storage nodes with data loss into an XOR sum of data of two stripe units on one data storage node by performing elimination on a created lost data formula $D_{u,s} \oplus D_{\langle u+2(s-r) \rangle_p,s} \oplus Q_s \oplus R_s = Q_{\langle u+s \rangle_p}' \oplus R_{\langle u+s-2r \rangle_p}'$, to obtain a formula $D_{u,s} \oplus D_{\langle u+2(s-r) \rangle_p,s} = Q_{\langle u+s \rangle_p}' \oplus R_{\langle u+s-2r \rangle_p}' \oplus Q_s \oplus R_s$, and obtain lost data on a data storage node in the $s^{th}$ row according to virtually-zero-filled data $D_{p-1,s}=0$ of the stripe unit; or transform the data of the stripe units on the two data storage nodes with data loss into an XOR sum of data of two stripe units on one data storage node by performing elimination on a created lost data formula $D_{u,r} \oplus D_{\langle u+2(s-r) \rangle_p,r} \oplus Q_s \oplus R_s = Q_{\langle u+2s-r \rangle_p}' \oplus R_{\langle u+r-r \rangle_p}'$, to obtain a formula $D_{u,r} \oplus Q_{\langle u+2(s-r) \rangle_p,r} = Q_{\langle u+2s-r \rangle_p}' \oplus R_{\langle u-r \rangle_p}' \oplus Q_s \oplus R_s$, and obtain lost data on a data storage node in the $r^{th}$ row according to virtually-zero-filled data $D_{p-1,r}=0$ of the stripe unit.

According to the embodiment of the present invention, parity data is used to perform data recovery, which can ensure effective utilization of a storage space in a distributed system, so as to meet a performance requirement of the distributed storage system; in a case that data on three nodes is lost, a target data storage node first recovered is determined according to symmetry of the lost data, and the lost data on three nodes is recovered according to parity data and data that is not lost, which can improve data recovery performance of the distributed storage system; in a case that data on a horizontal parity node and two data storage nodes is lost, one data storage node is first recovered, where an algorithm is simple and is easy to implement by using coding, and the recovery performance is higher than that of first recovering the horizontal parity node; and, the recovered data storage node may also be first sent to a user, and the data on the horizontal parity nodes is concurrently recovered, thereby reducing waiting time for the user and improving user satisfaction.

Embodiment 7

Figure 7:
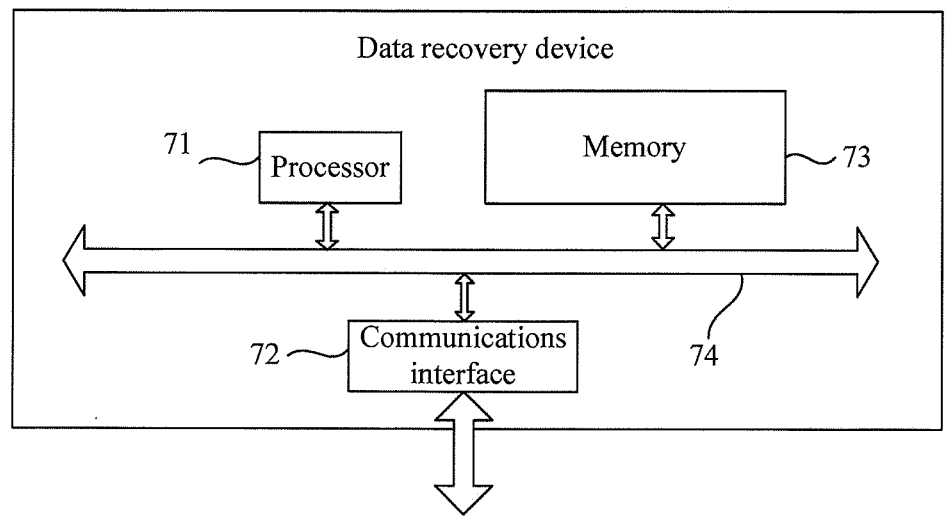
FIG. 7 is a structural block diagram of a data recovery device according to Embodiment 7 of the present invention.

FIG. 7 is a structural block diagram of a data recovery device of Embodiment 7 of the present invention. The data recovery device may be a host server, a personal computer PC, a portable computer or a terminal, or the like, that has a computing capability. Specific embodiments of the present invention do not limit specific implementation of a computing node.

The data recovery device includes a processor 71, a communications interface 72, a memory 73 and a bus 74, where mutual communication between the processor 71, the communications interface 72 and the memory 73 is completed by using the bus 74.

The communications interface 72 is configured to communicate with a network element, where the network element includes a virtual machine administration center, shared storage, and the like.

The processor 71 is configured to execute a program. The processor 71 may be a central processing unit CPU, or an application specific integrated circuit ASIC (Application Specific Integrated Circuit), or is configured into one or more integrated circuits for performing the embodiments of the present invention.

The memory 73 is configured to store a file. The memory 73 may include a high speed RAM memory, and may also include a non-volatile memory, for example, at least one disk memory. The memory 73 may also be a memory array. The memory 73 may be divided into blocks, and the blocks may be combined into a virtual volume according to a certain rule.

In one possible implementation manner, the foregoing program may be a program code that includes a computer operational instruction. The program may be specifically used to:

in a case that a distributed storage system loses data on three nodes, recover data on a target data storage node of the data on the three nodes according to data on a parity node and a data storage node without data loss, where the target data storage node is determined according to symmetry of the lost data; and perform degraded recovery on the remaining lost data according to the recovered data on the target data storage node.

In one possible implementation manner, in a case that the lost data on the three nodes includes data on three data storage nodes, the target data storage node is a data storage node with data loss and having an intermediate disk number; and the recovering data on a target data storage node of the data on the three nodes according to data on a parity node and a data storage node without data loss includes:

generating a diagonal adjuster and an inverse diagonal adjuster according to parity data, where the parity data includes data on a horizontal parity node, a diagonal parity node and an inverse diagonal parity node;

generating first horizontal parity data, first diagonal parity data and first inverse diagonal parity data according to the data on the data storage node without data loss, the diagonal adjuster and the inverse diagonal adjuster; and obtaining the data on the data storage node with data loss and having the intermediate disk number by performing an optimized cross transposition operation according to the diagonal adjuster, the inverse diagonal adjuster, the first horizontal parity data, the first diagonal parity data and the first inverse diagonal parity data.

In one possible implementation manner, the generating a diagonal adjuster and an inverse diagonal adjuster according to parity data includes:

generating the diagonal adjuster by using a formula $$Q_s = \bigoplus_{i=0}^{p-2}(P_i \oplus Q_i);$$

and generating the inverse diagonal adjuster by using a formula $$R_s = \bigoplus_{i=0}^{p-2}(P_i \oplus R_i),$$

where:

$Q_s$ is the diagonal adjuster, $R_s$ is the inverse diagonal adjuster, $P_i$ is data of the $i^{th}$ stripe unit on the horizontal parity node, $Q_i$ is data of the $i^{th}$ stripe unit on the diagonal parity node, $R_i$ is data of the $i^{th}$ stripe unit on the inverse diagonal parity node, $0 \leq i \leq p-2$, and p is a prime number greater than or equal to a quantity of the data storage nodes.

In one possible implementation manner, the generating first horizontal parity data, first diagonal parity data and first inverse diagonal parity data according to the data on the data storage node without data loss, the diagonal adjuster and the inverse diagonal adjuster includes:

generating the first horizontal parity data by using a formula $$P'_i = P_i \oplus \left(\bigoplus_{\substack{j=0 \\ j \neq r,s,t}}^{p'-1} D_{i,j}\right);$$

generating the first diagonal parity data by using a formula $$Q'_i = Q_s \oplus Q_i \oplus \left(\bigoplus_{\substack{j=0 \\ j \neq r,s,t}}^{p'-1} D_{<i-j>_p,j}\right);$$

and generating the first inverse diagonal parity data by using a formula $$R'_i = R_s \oplus R_i \oplus \left(\bigoplus_{\substack{j=0 \\ j \neq r,s,t}}^{p'-1} D_{<i+j>_p,j}\right),$$

where $P_i'$ is the first horizontal parity data, $Q_i'$ is the first diagonal parity data, $R_i'$ is the first inverse diagonal parity data, $D_{i,j}$ is data of the $i^{th}$ stripe unit on a data storage node in the $i^{th}$ row, r, s, and t are disk numbers of the data storage nodes with data loss, p' is the quantity of the data storage nodes, $0 \leq j \leq p'-1$, $0 \leq r < s < t < p' \leq p$, and $< >_p$ is to perform a modulus operation on p.

In one possible implementation manner, the obtaining data on the data storage node with data loss and having the intermediate disk number by performing an optimized cross transposition operation according to the diagonal adjuster, the inverse diagonal adjuster, the first horizontal parity data, the first diagonal parity data and the first inverse diagonal parity data includes:

creating a formula of the data storage node with data loss and having the intermediate disk number by performing a cross transposition operation:

$$A_d = D_{d,s} \oplus D_{<d+a>_p,S} \oplus D_{<d+b>_p,S}$$
$$\oplus D_{<d+a+b>_p,S} = P_{<d>_p} \oplus P_{<d+a+b>_p}'$$
$$\oplus R_{<d-r>_p} \oplus Q_{<d+t>_p};$$

where:

$0 \leq d \leq p-1$, s is a disk number of the data storage node with data loss and having the intermediate disk number, and a and b are disk number differences between the three data storage nodes with data loss, where a=s−r, b=t−s; and after performing elimination on the formula of the data storage node with data loss and having the intermediate disk number according to a shift step size and a quantity of cyclic XOR sum times determined according to the disk number differences between the data storage nodes with data loss, transforming the data of the stripe units on all the data storage nodes with data loss into an XOR sum of data of two stripe units on the data storage node with data loss and having the intermediate disk number, and obtaining data on the data storage node with data loss and having the intermediate disk number.

In one possible implementation manner, after performing elimination on the formula of the data storage node with data loss and having the intermediate disk number, the transforming the data of the stripe units on all the data storage nodes with data loss into an XOR sum of data of two stripe units on the data storage node with data loss and having the intermediate disk number includes:

adopting a step size offDis to perform XOR sum for k times on the formula of the data storage node with data loss and having the intermediate disk number, to obtain a formula $$D_{u,s} \oplus D_{<u+2minDis>_p,s} = \sum_{v=0}^{k-1} A_{<u+v \times offDis>_p}$$

of the data storage node with data loss and having the intermediate disk number, where k is determined according to a formula $$\begin{cases} <b - m \times a>_p = 0 \\ <a - n \times b>_p = 0 \\ k = \min\{m, n\} \end{cases};$$

if k=m, then min Dis=b, offDis=a; otherwise, min Dis=a, offDis=b, $<u+v \times offDis>_p = d$, and $0 \leq u \leq p-1$, where:

a cyclic equation set obtained according to the formula of the data storage node with data loss and having the intermediate disk number is used to represent an XOR sum of two pieces of data on the intermediate data storage node, and each formula in the cyclic equation set at most has two variables; and the obtaining data on the data storage node with data loss and having the intermediate disk number includes:

substituting virtually-zero-filled data $D_{p-1,s}=0$ of a stripe unit on the data storage node with data loss and having the intermediate disk number into a formula having only one variable in the cyclic equation set for a solution, solving other formulas in the cyclic equation set in sequence according to a result of the solution, and obtaining each piece of data on the data storage node with data loss and having the intermediate disk number.

In one possible implementation manner, in a case that the lost data on the three nodes includes data on a horizontal parity node and two data storage nodes, the target data storage node is either of the two data storage nodes with data loss, and the recovering data on a target data storage node of the data on the three nodes according to data on a parity node and a data storage node without data loss includes:

generating an XOR sum of a diagonal adjuster and an inverse diagonal adjuster according to the data on the diagonal parity node and the inverse diagonal parity node;

generating second diagonal parity data and second inverse diagonal parity data according to the data on the data storage node without data loss; and obtaining data on either of the two data storage nodes with data loss by performing a symmetric elimination operation according to the XOR sum of the diagonal adjuster and the inverse diagonal adjuster, the second diagonal parity data and the second inverse diagonal parity data.

In one possible implementation manner, the generating an XOR sum of a diagonal adjuster and an inverse diagonal adjuster according to the data on the diagonal parity node and the inverse diagonal parity node includes:

generating the XOR sum of the diagonal adjuster and the inverse diagonal adjuster by using a formula $$Q_s \oplus R_s = \left(\bigoplus_{i=0}^{p-2} Q_i\right) \oplus \left(\bigoplus_{i=0}^{p-2} R_i\right),$$

where $Q_s$ is the diagonal adjuster, $R_s$ is the inverse diagonal adjuster, $Q_i$ is data of the $i^{th}$ stripe unit on the diagonal parity node, $R_i$ is data of the $i^{th}$ stripe unit on the inverse diagonal parity node, $0 \leq i \leq p-2$, p is the disk number of the lost horizontal parity data, and p is a prime number greater than or equal to the quantity of the data storage nodes.

In one possible implementation manner, the generating second diagonal parity data and second inverse diagonal parity data according to the data on the data storage node without data loss includes:

generating the second diagonal parity data by using a formula $$Q_i' = Q_i \oplus \left(\bigoplus_{\substack{j=0 \\ j \neq r,s}}^{p'-1} D_{<i-j>_p,j}\right);$$

and generating the second inverse diagonal parity data by using a formula $$R'_i = R_i \oplus \left( \bigoplus_{\substack{j=0 \\ j \neq r,s}}^{p'-1} D_{<i+j>_p,j} \right),$$

where:

$Q_i'$ is the second diagonal parity data, $R_i'$ is the second inverse diagonal parity data, $D_{i,j}$ is data of the $i^{th}$ stripe unit on a data storage node in the $j^{th}$ row, r and s are disk numbers of the data storage nodes with data loss, p' is the quantity of the data storage nodes, $0 \leq j \leq p'-1$, $0 \leq r < s < p' \leq p$, and $<>_p$ is to perform a modulus operation on p.

In one possible implementation manner, the obtaining the data on either of the two data storage nodes with data loss by performing a symmetric elimination operation according to the XOR sum of the diagonal adjuster and the inverse diagonal adjuster, the second diagonal parity data and the second inverse diagonal parity data includes:

transforming the data of the stripe units on the two data storage nodes with data loss into an XOR sum of data of two stripe units on one data storage node by performing elimination on a created lost data formula $D_{u,s} \oplus D_{<u+2(s-r)>_p,s} \oplus Q_s \oplus R_s = Q_{<u+s>_p}' \oplus R_{<u+s-2r>_p}'$, to obtain a formula $D_{u,s} \oplus Q_{<u+2(s-r)>_p,s} = Q_{<u+s>_p}' \oplus R_{<u+s-2r>_p}' \oplus Q_s \oplus R_s$, and obtaining lost data on a data storage node in the $s^{th}$ row according to virtually-zero-filled data $D_{p-1,s}=0$ of the stripe unit; or transforming the data of the stripe units on the two data storage nodes with data loss into an XOR sum of data of two stripe units on one data storage node by performing elimination on a created lost data formula $D_{u,r} \oplus D_{<u+2(s-r)>_p,r} \oplus Q_s \oplus R_s = Q_{<u+2s-r>_p}' \oplus R_{<u+r-r>_p}'$, to obtain a formula $D_{u,r} \oplus Q_{<u+2(s-r)>_p,r} = Q_{<u+2s-r>_p}' \oplus R_{<u-r>_p}' \oplus Q_s \oplus R_s$, and obtaining lost data on a data storage node in the $r^{th}$ row according to virtually-zero-filled data $D_{p-1,r}=0$ of the stripe unit.

According to the embodiment of the present invention, parity data is used to perform data recovery, which can ensure effective utilization of a storage space in a distributed system, so as to meet a performance requirement of the distributed storage system; and in a case that data on three nodes is lost, a target data storage node first recovered is determined according to symmetry of the lost data, and the lost data on the three nodes is recovered according to parity data and data that is not lost, which can improve data recovery performance of the distributed storage system.

Embodiment 8

Figure 8:
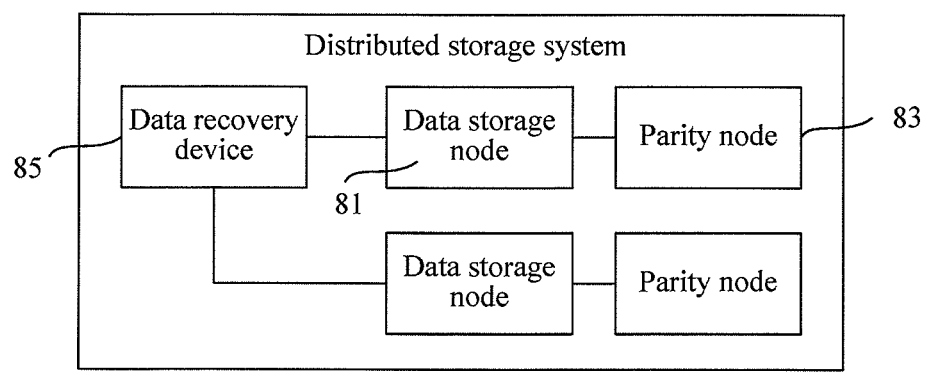
FIG. 8 is a structural block diagram of a distributed storage system according to Embodiment 8 of the present invention.

FIG. 8 is a structural block diagram of a distributed storage system of Embodiment 8 of the present invention. As shown in FIG. 8, the distributed storage system includes a plurality of data storage nodes 81, a plurality of parity nodes 83 and a data recovery device 85, where a data recovery device of any structure of the embodiment of the present invention is used as the data recovery device 85.

According to the embodiment of the present invention, parity data is used to perform data recovery, which can ensure effective utilization of a storage space in a distributed system, so as to meet a performance requirement of the distributed storage system; and in a case that data on three nodes is lost, a target data storage node first recovered is determined according to symmetry of the lost data, and the lost data on the three nodes is recovered according to parity data and data that is not lost, which can improve data recovery performance of the distributed storage system.

A person of ordinary skill in the art may be aware that, exemplary units and algorithm steps in the embodiments described in this specification may be implemented by electronic hardware or a combination of computer software and electronic hardware. Whether the functions are implemented by hardware or software depends on particular applications and design constraint conditions of the technical solutions. A person skilled in the art may select different methods to implement the described functions for a particular application, but it should not be considered that the implementation goes beyond the scope of the present invention.

In case that the functions are implemented in a form of computer software that is sold or used as an independent product, to some extent it may be regard that the technical solution of the present invention is entirely or partially shown in a form of a computer software product. The computer software product is usually stored in a computer-readable storage medium, and includes a plurality of instructions so as to enable a computer equipment (may be a personal computer, a server, or a network equipment, and the like) to perform entire or partial steps of the methods according to each embodiment of the present invention. The foregoing storage medium includes: any medium that can store program code, such as a USB flash drive, a removable hard disk, a Read-Only Memory (ROM), a Random Access Memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data recovery method, comprising:
    in a case that a distributed storage system loses data on three nodes, recovering data on a target data storage node of the data on the three nodes according to data on a parity node and a data storage node without data loss, wherein the target data storage node is determined according to symmetry of the lost data; and
    performing degraded recovery on the remaining lost data according to the recovered data of the target data storage node.

2. The data recovery method according to claim 1, wherein:
    in a case that the lost data on the three nodes comprises data on three data storage nodes, the target data storage node is a data storage node with data loss and having an intermediate disk number; and
    the recovering data on a target data storage node of the data on the three nodes according to data on a parity node and a data storage node without data loss comprises:
        generating a diagonal adjuster and an inverse diagonal adjuster according to parity data, wherein the parity data comprises data on a horizontal parity node, a diagonal parity node and an inverse diagonal parity node;
        generating first horizontal parity data, first diagonal parity data and first inverse diagonal parity data according to the data on the data storage node without data loss, the diagonal adjuster and the inverse diagonal adjuster; and obtaining data on the data storage node with data loss and having the intermediate disk number by performing an optimized cross transposition operation according to the diagonal adjuster, the inverse diagonal adjuster, the first horizontal parity data, the first diagonal parity data and the first inverse diagonal parity data.

3. The data recovery method according to claim 2, wherein generating a diagonal adjuster and an inverse diagonal adjuster according to parity data comprises:

generating the diagonal adjuster by using a formula $$Q_s = \bigoplus_{i=0}^{p-2}(P_i \oplus Q_i);$$

and generating the inverse diagonal adjuster by using a formula $$R_s = \bigoplus_{i=0}^{p-2}(P_i \oplus R_i),$$

wherein:

$Q_s$ is the diagonal adjuster, $R_s$ is the inverse diagonal adjuster, $P_i$ is data of the $i^{th}$ stripe unit on the horizontal parity node, $Q_i$ is data of the $i^{th}$ stripe unit on the diagonal parity node, $R_i$ is data of the $i^{th}$ stripe unit on the inverse diagonal parity node, $0 \le i \le p-2$, and p is a prime number greater than or equal to a quantity of the data storage nodes.

4. The data recovery method according to claim 3, wherein generating first horizontal parity data, first diagonal parity data and first inverse diagonal parity data according to the data on the data storage node without data loss, the diagonal adjuster and the inverse diagonal adjuster comprises:

generating the first horizontal parity data by using a formula $$P'_i = P_i \oplus \left( \bigoplus_{\substack{j=0 \\ j \ne r,s,t}}^{p'-1} D_{i,j} \right);$$

generating the first diagonal parity data by using a formula $$Q'_i = Q_s \oplus Q_i \oplus \left( \bigoplus_{\substack{j=0 \\ j \ne r,s,t}}^{p'-1} D_{\langle i-j \rangle_p, j} \right);$$

and generating the first inverse diagonal parity data by using a formula $$R'_i = R_s \oplus R_i \oplus \left( \bigoplus_{\substack{j=0 \\ j \ne r,s,t}}^{p'-1} D_{\langle i+j \rangle_p, j} \right),$$

wherein:

$P_i'$ is the first horizontal parity data, $Q_i'$ is the first inverse diagonal parity data, $R_i'$ is the first inverse diagonal parity data, $D_{i,j}$ is data of the $i^{th}$ stripe unit on a data storage node in the $j^{th}$ row, r, s, and t are disk numbers of the data storage nodes with data loss, p' is the quantity of the data storage nodes, $0 \le j \le p'-1$, $0 \le r < s < t < p' \le p$, and $\langle \rangle_p$ is to perform a modulus operation on p.

5. The data recovery method according to claim 4, wherein obtaining data on the data storage node with data loss and having the intermediate disk number by using an optimized cross transposition operation according to the diagonal adjuster, the inverse diagonal adjuster, the first horizontal parity data, the first diagonal parity data and the first inverse diagonal parity data comprises:

creating a formula of the data storage node with data loss and having the intermediate disk number by performing a cross transposition operation:

$$A_d = D_{d,S} \oplus D_{\langle d+a \rangle_p, S} \oplus D_{\langle d+b \rangle_p, S} \\ \oplus D_{\langle d+a+b \rangle_p, S} = P'_{\langle d \rangle_p} \oplus P'_{\langle d+a+b \rangle_p} \\ \oplus R'_{\langle d-r \rangle_p} \oplus Q'_{\langle d+t \rangle_p}, \text{wherein:}$$

$0 \le d \le p-1$, s is a disk number of the data storage node with data loss and having the intermediate disk number, and a and b are disk number differences between the three data storage nodes with data loss, wherein a = s −r, b = t −s ; and after performing elimination on the formula of the data storage node with data loss and having the intermediate disk number according to a shift step size and a quantity of cyclic XOR sum times determined according to the disk number differences between the data storage nodes with data loss, transforming the data of the stripe units on all the data storage nodes with data loss into an XOR sum of data of two stripe units on the data storage node with data loss and having the intermediate disk number, and obtaining data on the data storage node with data loss and having the intermediate disk number.

6. The data recovery method according to claim 5, wherein:

after performing elimination on the formula of the data storage node with data loss and having the intermediate disk number, transforming the data of the stripe units on all the data storage nodes with data loss into an XOR sum of data of two stripe units on the data storage node with data loss and having the intermediate disk number comprises:

adopting a step size offDis to perform XOR sum for k times on the formula of the data storage node with data loss and having the intermediate disk number, to obtain a formula $$D_{u,s} \oplus D_{\langle u+2minDis \rangle_p, s} = \sum_{v=0}^{k-1} A_{\langle u+v \times offDis \rangle_p}$$

of the data storage node with data loss and having the intermediate disk number, wherein k is determined according to a formula $$\begin{cases} \langle b - m \times a \rangle_p = 0 \\ \langle a - n \times b \rangle_p = 0 \, ; \\ k = \min\{m, n\} \end{cases}$$

if k=m , then min Dis=b, offDis=a; otherwise, min Dis=a, offDis=b , <u +v ×offDis>$_p$=d, and 0≤u≤p−1, wherein:
 a cyclic equation set obtained according to the formula of the data storage node with data loss and having the intermediate disk number is used to represent an XOR sum of two pieces of data on the intermediate data storage node, and each formula in the cyclic equation set at most has two variables; and
obtaining data on the data storage node with data loss and having the intermediate disk number comprises:
 substituting virtually-zero-filled data D$_{p-1,s}$=0 of a stripe unit on the data storage node with data loss and having the intermediate disk number into a formula having only one variable in the cyclic equation set for a solution, solving other formulas in the cyclic equation set in sequence according to a result of the solution, and obtaining each piece of data on the data storage node with data loss and having the intermediate disk number.

7. The data recovery method according to claim 1, wherein:
 in a case that the lost data on the three nodes comprises data on a horizontal parity node and two data storage nodes, the target data storage node is either of the two data storage nodes with data loss; and
 the recovering data on a target data storage node of the data on the three nodes according to data on a parity node and a data storage node without data loss comprises:
 generating an XOR sum of a diagonal adjuster and an inverse diagonal adjuster according to data on a diagonal parity node and an inverse diagonal parity node comprised by parity data;
 generating second diagonal parity data and second inverse diagonal parity data according to the data on the data storage node without data loss; and
 obtaining data of either of the two data storage nodes with data loss by performing a symmetric elimination operation according to the XOR sum of the diagonal adjuster and the inverse diagonal adjuster, the second diagonal parity data and the second inverse diagonal parity data.

8. The data recovery method according to claim 7, wherein generating an XOR sum of a diagonal adjuster and an inverse diagonal adjuster according to data of a diagonal parity node and an inverse diagonal parity node comprised by parity data comprises:
 generating the XOR sum of the diagonal adjuster and the inverse diagonal adjuster by using a formula $$Q_S \oplus R_S = \left( \bigoplus_{i=0}^{p-2} Q_i \right) \oplus \left( \bigoplus_{i=0}^{p-2} R_i \right),$$

wherein Q$_s$ is the diagonal adjuster, R$_s$ is the inverse diagonal adjuster, Q$_i$ is data of the i$^{th}$ stripe unit on the diagonal parity node, R$_i$ is data of the i$^{th}$ stripe unit on the inverse diagonal parity node, 0≤i≤p−2, p is a disk number of the lost horizontal parity data, and p is a prime number greater than or equal to a quantity of the data storage nodes.

9. The data recovery method according to claim 8, wherein generating second diagonal parity data and second inverse diagonal parity data according to the data on the data storage node without data loss comprises:
 generating the second diagonal parity data by using a formula $$Q'_i = Q_i \oplus \left( \bigoplus_{\substack{j=0 \\ j \ne r,s}}^{p'-1} D_{\langle i-j \rangle_p, j} \right);$$

and
generating the second inverse diagonal parity data by using a formula $$R'_i = R_i \oplus \left( \bigoplus_{\substack{j=0 \\ j \ne r,s}}^{p'-1} D_{\langle i+j \rangle_p, j} \right),$$

wherein:
 Q$_i$' is the second diagonal parity data, R$_i$' is the second inverse diagonal parity data, D$_{i,j}$ is data of the i$^{th}$ stripe unit on a data storage node in the j$^{th}$ row, r and s are disk numbers of the data storage nodes with data loss, p' is the quantity of the data storage nodes, 0≤j≤p'−1, 0≤r<s<p'≤p, and <>$_p$ is to perform a modulus operation on p.

10. The data recovery method according to claim 9, wherein obtaining data on either of the two data storage nodes with data loss by performing a symmetric elimination operation according to the XOR sum of the diagonal adjuster and the inverse diagonal adjuster, the second diagonal parity data and the second inverse diagonal parity data comprises:
 transforming the data of the stripe units on the two data storage nodes with data loss into an XOR sum of data of two stripe units on one data storage node by performing elimination on a created lost data formula D$_{u,s}$⊕D$_{\langle u+2(s-r) \rangle_p, s}$⊕Q$_s$⊕R$_s$=Q'$_{\langle u+s \rangle_p}$⊕R'$_{\langle u+s-2r \rangle_p}$, to obtain a formula D$_{u,s}$⊕D$_{\langle u+2(s-r) \rangle_p, s}$=Q'$_{\langle u+s \rangle_p}$⊕R'$_{\langle u+s-2r \rangle_p}$⊕Q$_s$⊕R$_s$, and obtaining lost data on a data storage node in the s$^{th}$ row according to virtually-zero-filled data D$_{p-1,s}$=0 of the stripe unit; or
 transforming the data of the stripe units on the two data storage nodes with data loss into an XOR sum of data of two stripe units on one data storage node by performing elimination on a created lost data formula D$_{u,r}$⊕D$_{\langle u+2(s-r) \rangle_p, r}$ ⊕Q$_s$ ⊕R$_s$ =Q'$_{\langle u+2s-r \rangle_p}$ ⊕R'$_{\langle u-r \rangle_p}$,to obtain a formula D$_{u,r}$ ⊕D$_{\langle u+2(s-r) \rangle_p, r}$ =Q'$_{\langle u+2s-r \rangle_p}$ ⊕R'$_{\langle u-r \rangle_p}$ ⊕Q$_s$ ⊕R$_s$, and obtaining lost data on a data storage node in the r$^{th}$ row according to virtually-zero-filled data D$_{p-1,r}$=0 of the stripe unit.

11. A data recovery device, comprising:
 a memory storing computer-executable instructions; and
 a processor configured to execute the computer-executable instructions to cause the device to perform the following:
 in a case that a distributed storage system loses data on three nodes, recover data on a target data storage node of the data on the three nodes according to data on a parity node and a data storage node without data loss, wherein the target data storage node is determined according to symmetry of the lost data, and perform degraded recovery on the remaining lost data according to the recovered data on the target data storage node.

12. The data recovery device according to claim 11, in a case that the lost data on the three nodes comprises data on three data storage nodes, the target data storage node is a data storage node with data loss and having an intermediate disk number, wherein the processor is configured to execute the computer-executable instructions to cause the device to:

generate a diagonal adjuster and an inverse diagonal adjuster according to parity data, wherein the parity data comprises data on a horizontal parity node, a diagonal parity node and an inverse diagonal parity node;

generate first horizontal parity data, first diagonal parity data and first inverse diagonal parity data according to the data on the data storage node without data loss, the diagonal adjuster and the horizontal adjuster; and obtain the data on the data storage node with data loss and having the intermediate disk number by performing an optimized cross transposition operation according to the diagonal adjuster, the inverse diagonal adjuster, the first horizontal parity data, the first diagonal parity data and the first inverse diagonal parity data.

13. The data recovery device according to claim 12, wherein the processor is configured to execute the computer-executable instructions to cause the device to:

generate the diagonal adjuster by using a formula $$Q_s = \bigoplus_{i=0}^{p-2}(P_i \oplus Q_i);$$

and generate the inverse diagonal adjuster by using a formula $$R_s = \bigoplus_{i=0}^{p-2}(P_i \oplus R_i),$$

wherein:

$Q_s$ is the diagonal adjuster, $R_s$ is the inverse diagonal adjuster, $P_i$ is data of the $i^{th}$ stripe unit on the horizontal parity node, $Q_i$ is data of the $i^{th}$ stripe unit on the diagonal parity node, $R_i$ is data of the $i^{th}$ stripe unit on the inverse diagonal parity node, $0 \le i \le p-2$, and p is a prime number greater than or equal to a quantity of the data storage nodes.

14. The data recovery device according to claim 13, wherein the processor is configured to execute the computer-executable instructions to cause the device to:

generate the first horizontal parity data by using a formula $$P'_i = P_i \oplus \left(\bigoplus_{\substack{j=0 \\ j \ne r,s,t}}^{p'-1} D_{i,j}\right);$$

generate the first diagonal parity data by using a formula $$Q'_i = Q_s \oplus Q_i \oplus \left(\bigoplus_{\substack{j=0 \\ j \ne r,s,t}}^{p'-1} D_{\langle i-j \rangle_p, j}\right);$$

and generate the first inverse diagonal parity data by using a formula $$R'_i = R_s \oplus R_i \oplus \left(\bigoplus_{\substack{j=0 \\ j \ne r,s,t}}^{p'-1} D_{\langle i+j \rangle_p, j}\right);$$

wherein:

$P'_i$ is the first horizontal parity data, $Q'_i$ is the first diagonal parity data, $R'_i$ is the first inverse diagonal parity data, $D_{i,j}$ is data of the $i^{th}$ stripe unit on a data storage node in the $j^{th}$ row, r, s, and t are disk numbers of the data storage nodes with data loss, p' is the quantity of the data storage nodes, $0 \le j \le p'-1$, $0 \le r < s < t < p' \le p$, and $\langle \rangle_p$ is to perform a modulus operation on p.

15. The data recovery device according to claim 14, wherein the processor is configured to execute the computer-executable instructions to cause the device to:

create a formula of the data storage node with data loss and having the intermediate disk number by performing a cross transposition operation:

$$A_d = D_{d,S} \oplus D_{\langle d+a \rangle_p, S} \oplus D_{\langle d+b \rangle_p, S} \\ \oplus D_{\langle d+a+b \rangle_p, S}' = P_{\langle d \rangle_p}' \oplus P_{\langle d+a+b \rangle_p}' \\ \oplus R_{\langle d-r \rangle_p} \oplus Q_{\langle d+t \rangle_p}, \text{wherein:}$$

$0 \le d \le p-1$, s is a disk number of the data storage node with data loss and having the intermediate disk number, and a and b are disk number differences between the three data storage nodes with data loss, wherein $a=s-r, b=t-s$; and after performing elimination on the formula of the data storage node with data loss and having the intermediate disk number according to a shift step size and a quantity of cyclic XOR sum times determined according to the disk number differences between the data storage nodes with data loss, transform the data of the stripe units on all the data storage nodes with data loss into an XOR sum of data of two stripe units on the data storage node with data loss and having the intermediate disk number, and obtain data on the data storage node with data loss and having the intermediate disk number.

16. The data recovery device according to claim 15, wherein the processor is configured to execute the computer-executable instructions to cause the device to:

adopt a step size offDis to perform XOR sum for k times on the formula of the data storage node with data loss and having the intermediate disk number, to obtain a formula $$D_{u,s} \oplus D_{\langle u+2minDis \rangle_p, s} = \sum_{v=0}^{k-1} A_{\langle u+v \times offDis \rangle_p}$$

of the data storage node with data loss and having the intermediate disk number, wherein k is determined according to a formula $$\begin{cases} \langle b - m \times a \rangle_p = 0 \\ \langle a - n \times b \rangle_p = 0 \ ; \\ k = \min\{m, n\} \end{cases}$$

if k =m , then min Dis=b, offDis=a ; otherwise, min Dis=a, offDis=b, <u+v x offDis>$_p$ =d, and 0≤u≤p−1, wherein:

a cyclic equation set obtained according to the formula of the data storage node with data loss and having the intermediate disk number is used to represent an XOR sum of two pieces of data on the intermediate data storage node, and each formula in the cyclic equation set at most has two variables; and obtaining data on the data storage node with data loss and having the intermediate disk number comprises:

substituting virtually-zero-filled data $D_{p-1,s}$=0 of a stripe unit on the data storage node with data loss and having the intermediate disk number into a formula having only one variable in the cyclic equation set for a solution, solving other formulas in the cyclic equation set in sequence according to a result of the solution, and obtaining each piece of data on the data storage node with data loss and having the intermediate disk number.

17. The data recovery device according to claim 11, in a case that the lost data on the three nodes comprises data on a horizontal parity node and two data storage nodes, wherein the processor is configured to execute the computer-executable instructions to cause the device to:

generate an XOR sum of a diagonal adjuster and an inverse diagonal adjuster according to data on the diagonal parity node and the inverse diagonal parity node;

generate second diagonal parity data and second inverse diagonal parity data according to the data on the data storage node without data loss; and obtain data on either of the two data storage nodes with data loss by performing a symmetric elimination operation according to the XOR sum of the diagonal adjuster and the inverse diagonal adjuster, the second diagonal parity data and the second inverse diagonal parity data.

18. The data recovery device according to claim 17, wherein the processor is configured to execute the computer-executable instructions to cause the device to:

generate the XOR sum of the diagonal adjuster and the inverse diagonal adjuster by using a formula $$Q_S \oplus R_S = \left(\bigoplus_{i=0}^{p-2} Q_i\right) \oplus \left(\bigoplus_{i=0}^{p-2} R_i\right),$$

wherein $Q_s$ is the diagonal adjuster, $R_s$ is the inverse diagonal adjuster, $Q_i$ is data of the i$^{th}$ stripe unit on the diagonal parity node, R is data of the i$^{th}$ stripe unit on the inverse diagonal parity node, 0≤i≤p−2, p is a disk number of the lost horizontal parity data, and p is a prime number greater than or equal to a quantity of the data storage nodes.

19. The data recovery device according to claim 18, wherein the processor is configured to execute the computer-executable instructions to cause the device to:

generate the second diagonal parity data by using a formula $$Q'_i = Q_i \oplus \left(\bigoplus_{\substack{j=0 \\ j \neq r,s}}^{p'-1} D_{\langle i-j \rangle_p, j}\right);$$

and generate the second inverse diagonal parity data by using a formula $$R'_i = R_i \oplus \left(\bigoplus_{\substack{j=0 \\ j \neq r,s}}^{p'-1} D_{\langle i+j \rangle_p, j}\right),$$

wherein:

$Q'_i$ is the second diagonal parity data, $R'_i$ is the second inverse diagonal parity data, $D_{i,j}$ is data of the i$^{th}$ stripe unit on a data storage node in the j$^{th}$ row, r and s are disk numbers of the data storage nodes with data loss, 0≤j≤p'−1, 0≤r<s<p'≤p, and $\langle \rangle_p$ is to perform a modulus operation on p.

20. The data recovery device according to claim 19, wherein the processor is configured to execute the computer-executable instructions to cause the device to:

transform the data of the stripe units on the two data storage nodes with data loss into an XOR sum of data of two stripe units on one data storage node by performing elimination on a created lost data formula $D_{u,s} \oplus D_{\langle u+2(s-r)\rangle_p,s} \oplus Q_s \oplus R_s = Q_{\langle u+s \rangle_p}' \oplus R_{\langle u+s-2r \rangle_p}'$, to obtain a formula $D_{u,s} \oplus Q_{\langle u+2(s-r)\rangle_p,s} = Q_{\langle u+s \rangle_p}' \oplus R_{\langle u+s-2r \rangle_p}' \oplus Q_s \oplus R_s$, and obtain lost data on a data storage node in the s$^{th}$ row according to virtually-zero-filled data $D_{p-1,s}$=0 of the stripe unit; or transform the data of the stripe units on the two data storage nodes with data loss into an XOR sum of data of two stripe units on one data storage node by performing elimination on a created lost data formula $D_{u,r} \oplus D_{\langle u+2(s-r)\rangle_p,r} \oplus Q_s \oplus R_s = Q_{\langle u+2s-r \rangle_p}' \oplus R_{\langle u+r-r \rangle_p}'$, to obtain a formula $D_{u,r} \oplus D_{\langle u+2(s-r)\rangle_p,r} = Q_{\langle u+2s-r \rangle_p}' \oplus R'_{\langle u-r \rangle_p} \oplus Q_s \oplus R_s$, and obtain lost data on a data storage node in the r$^{th}$ row according to virtually-zero-filled data $D_{p-1,r}$=0 of the stripe unit.

* * * * *